United States Patent
Glitho et al.

(10) Patent No.: US 6,625,141 B1
(45) Date of Patent: Sep. 23, 2003

(54) SYSTEM AND METHOD FOR PROVIDING VALUE-ADDED SERVICES (VAS) IN AN INTEGRATED TELECOMMUNICATIONS NETWORK USING SESSION INITIATION PROTOCOL (SIP)

(75) Inventors: Roch Glitho, Montreal (CA); Christophe Gourraud, Montreal (CA); Evelina Evloguieva, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/537,592

(22) Filed: Mar. 28, 2000

Related U.S. Application Data

(60) Provisional application No. 60/140,013, filed on Jun. 18, 1999.

(51) Int. Cl.[7] .................................................. H04L 12/66
(52) U.S. Cl. ..................... 370/352; 370/493; 707/4; 707/10; 709/203; 709/227
(58) Field of Search ................................. 370/352, 353, 370/354, 355, 356, 493, 494, 495, 465; 707/1, 3, 4, 5, 10; 709/10, 201, 203, 224, 227

(56) References Cited

U.S. PATENT DOCUMENTS

| | | | |
|---|---|---|---|
| 6,363,424 B1 * | 3/2002 | Douglas et al. | 709/224 |
| 6,421,674 B1 * | 7/2002 | Yoakum et al. | 707/10 |
| 6,430,176 B1 * | 8/2002 | Christie, IV | 370/355 |
| 6,446,127 B1 * | 9/2002 | Schuster et al. | 709/227 |
| 6,519,242 B1 * | 2/2003 | Emery et al. | 370/338 |

FOREIGN PATENT DOCUMENTS

| | | |
|---|---|---|
| EP | 0726682 A2 | 8/1996 |
| GB | 2318701 A | 4/1998 |

OTHER PUBLICATIONS

H. Schulzrinne, Columbia University; L. Slutsman, AT&T; I. Faynberg and H. Lu, Lucent Technologies; "Interworking between SIP and INAP", Jul. 2000, pp. 1–7.

"Accessing IN services from SIP networks", May 5, 2000; V. Gurbani, Lucent Technologies, Inc.; 1–18 pp.

"IN Services for Converged (Internet) Telephony", Intelligent Networks in the New Millennium; IEEE Communications Magazine; Jun. 2000; Tsun–Chieh Chiang, Janet Douglas, Vijay K. Gurbani, Warren A. Montgomery, William F. Opkyke, Jaya Reddy and Kumar Vemuri, Lucent Technologies; 108–115 pp.

* cited by examiner

*Primary Examiner*—Alpus H. Hsu
*Assistant Examiner*—Thien Tran
(74) *Attorney, Agent, or Firm*—Smith & Danamraj, PC

(57) ABSTRACT

A system and method for providing Value-Added Services (VAS) in an integrated telecommunications network having a packet-switched network portion (PSN) operable with Session Initiation Protocol (SIP). The integrated telecommunications network includes a SIPext SSP server, a trigger server, and a service node having a Service Logic Program (SLP) that is operable with Intelligent Network Application Protocol (INAP). The SIPext SSP and service nodes are provided with the capability to communicate using SIP-compliant messaging. New header fields are provided that specify operations to be performed by the service node with respect to a service. INAP service parametric data is also provided in the header fields in a sequential form. When a call is received in the SIPext SSP server for a user having a subscription for a VAS, it queries the user profile stored in the trigger server. If the user is subscribed for a service, a SIP request message is formulated based on the user profile, wherein appropriate headers are populated with relevant parametric information and call context data. The service node launches the SLP based on the information provided in the request message and sends a SIP response message to the SIPext SSP server with an instruction concerning the provisioning of the VAS. The SIPext SSP server, thereafter, takes an appropriate action based on the response message and any parametric information contained therein.

15 Claims, 18 Drawing Sheets

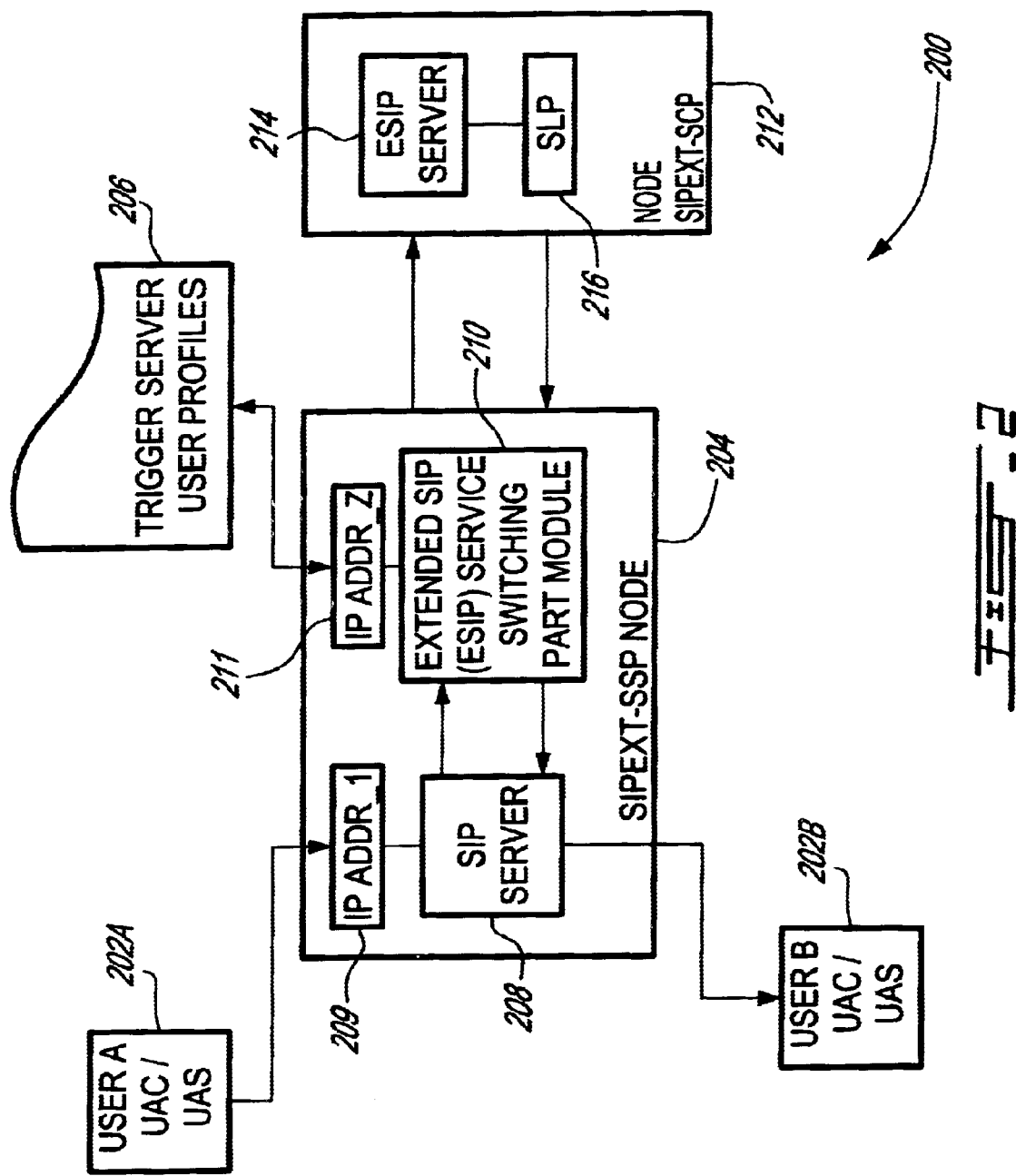

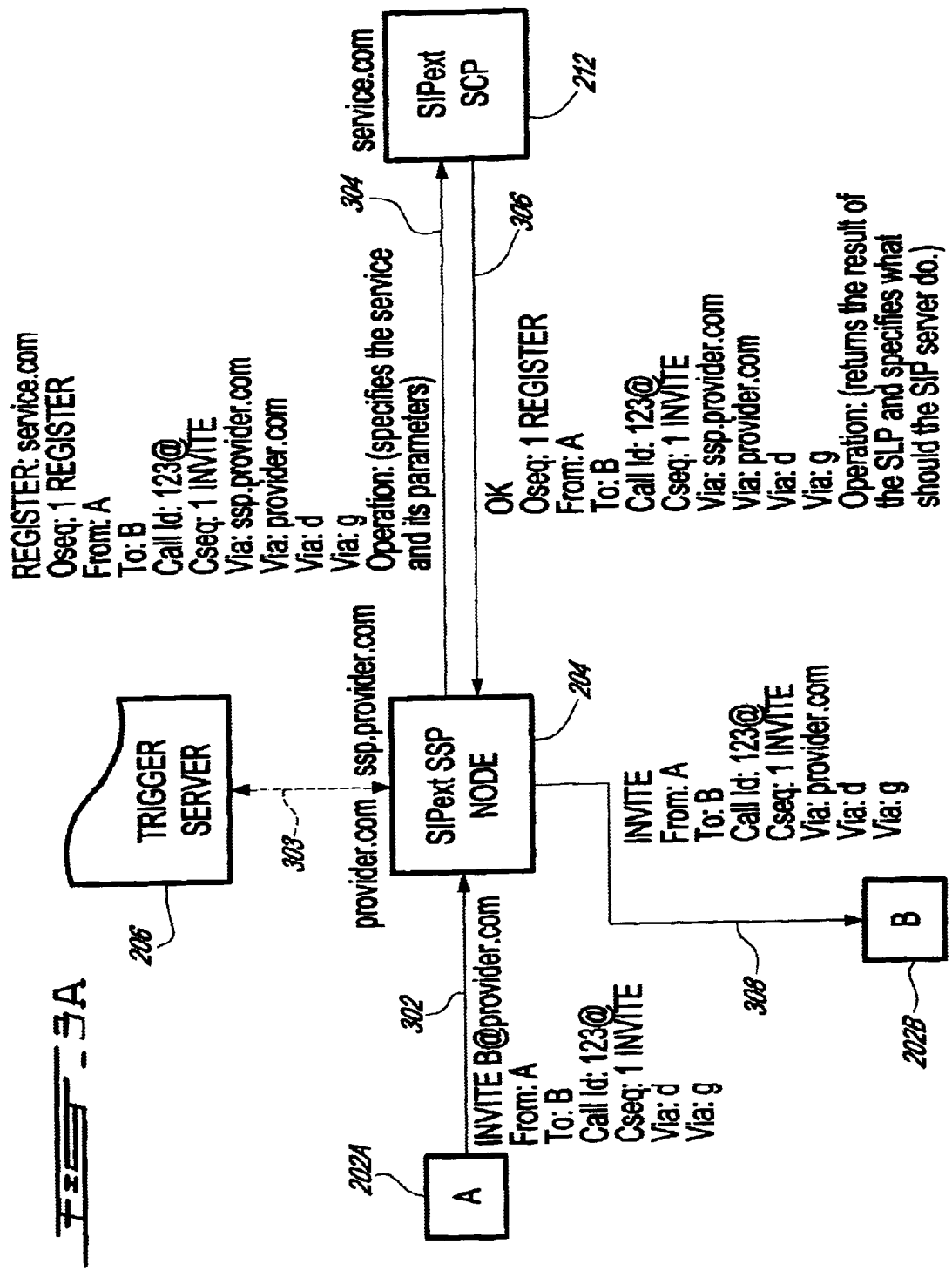

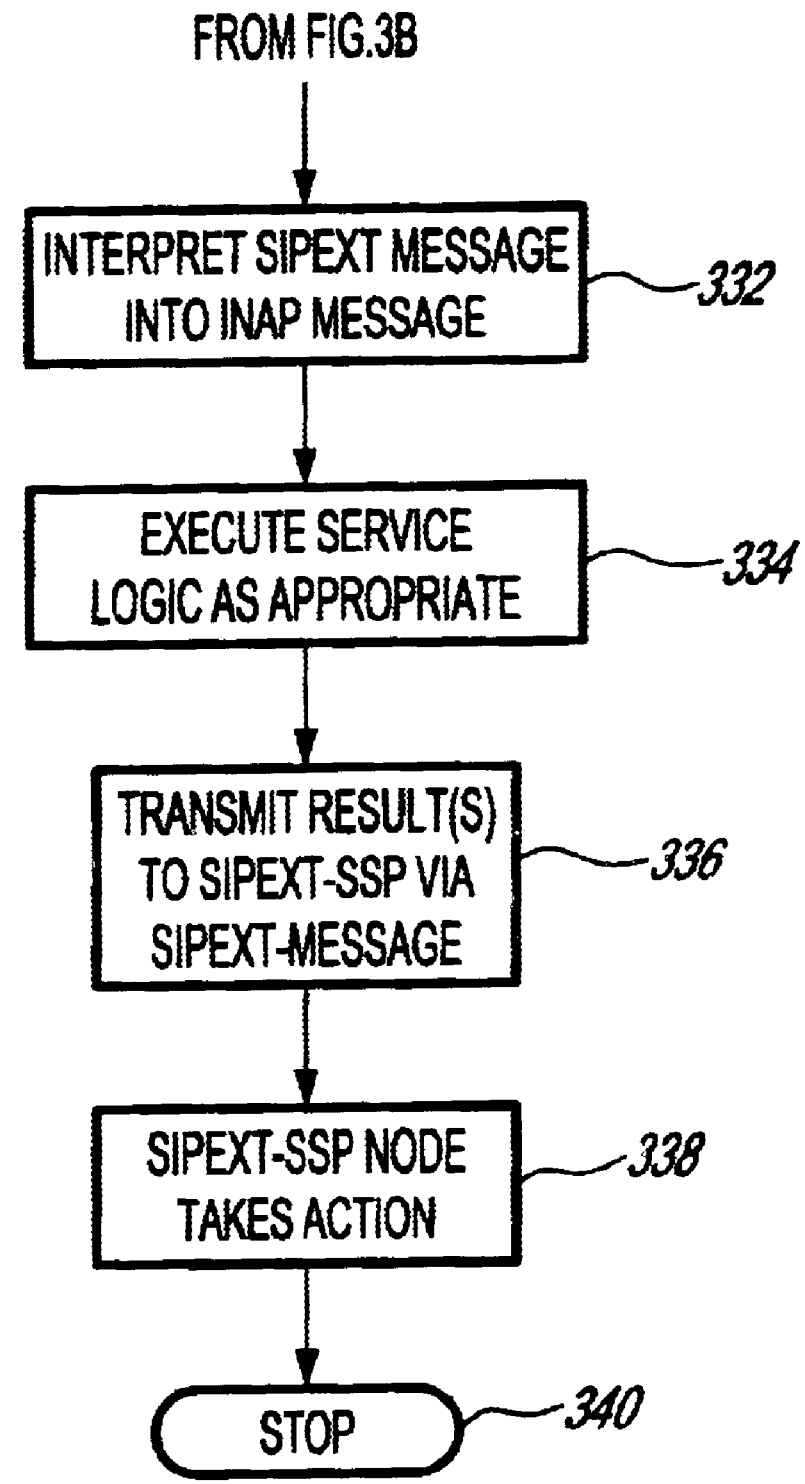

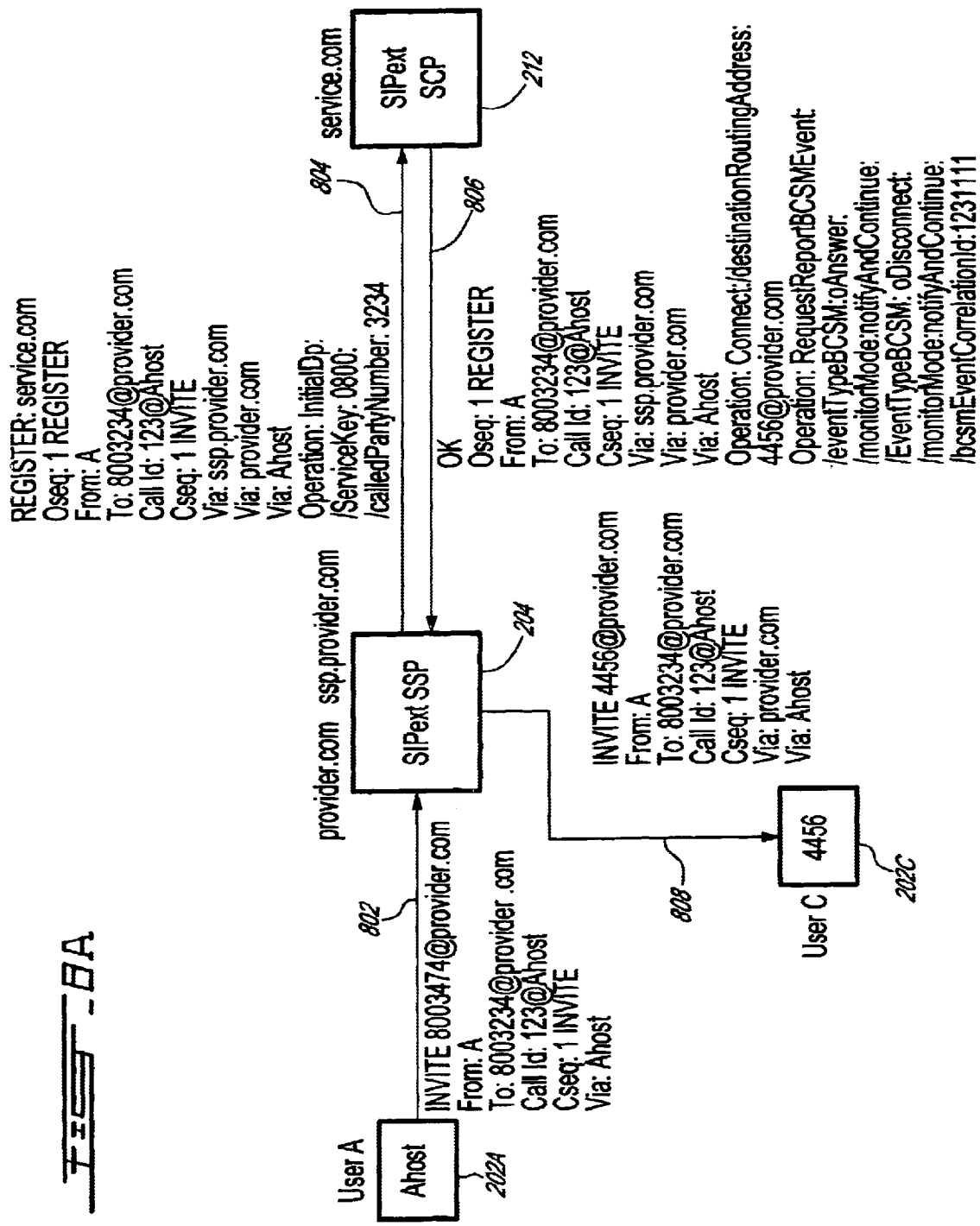

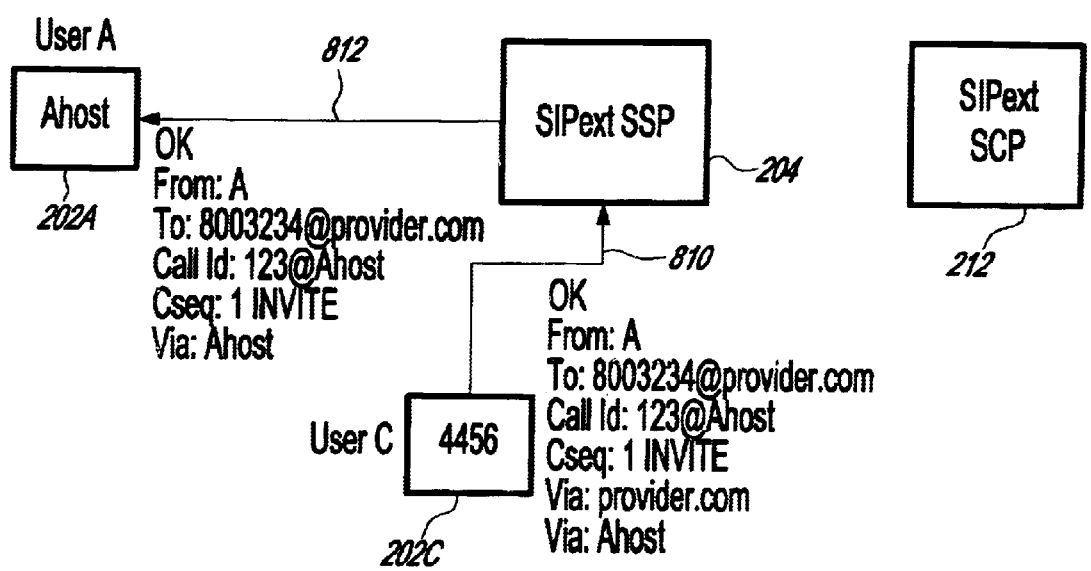

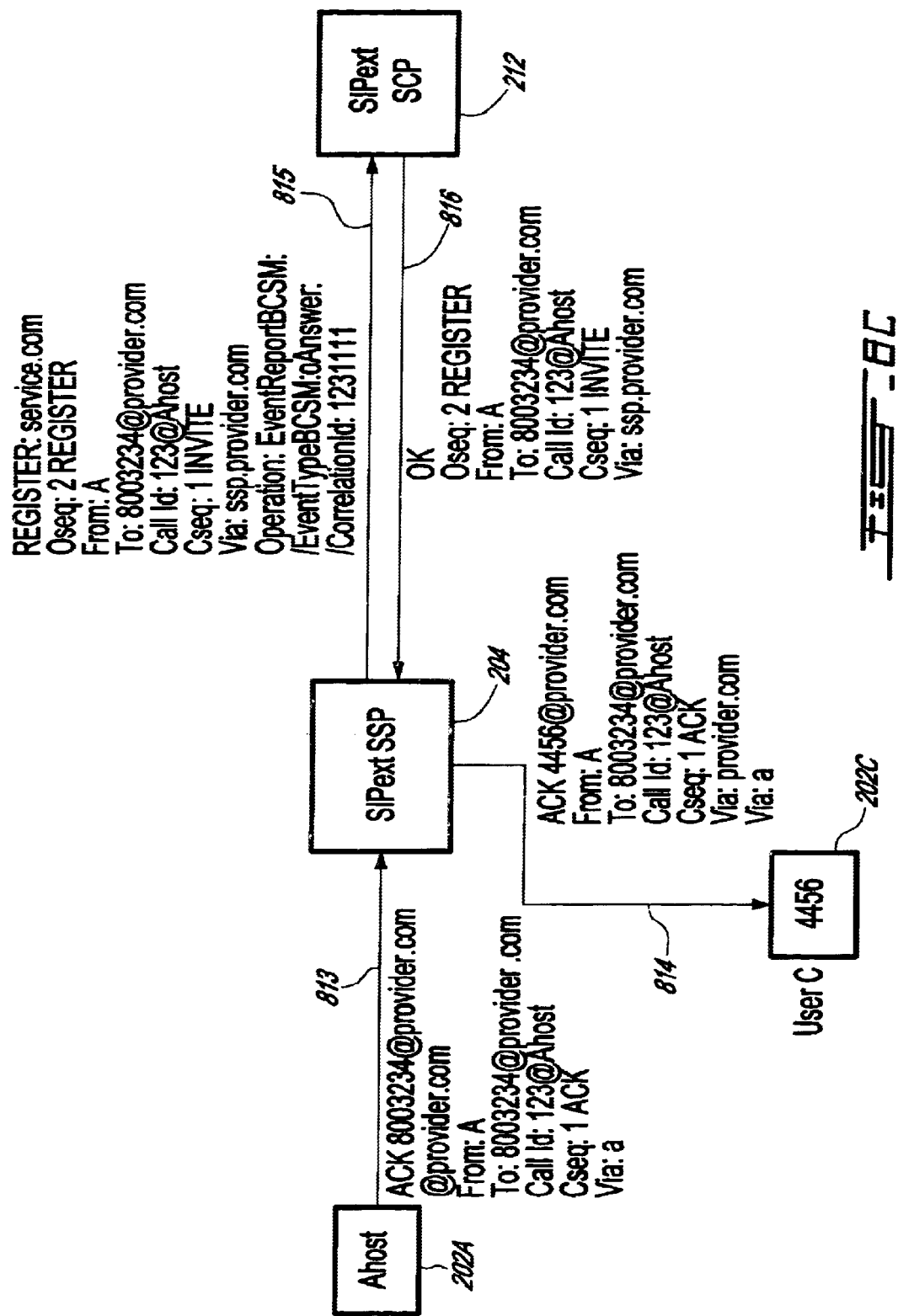

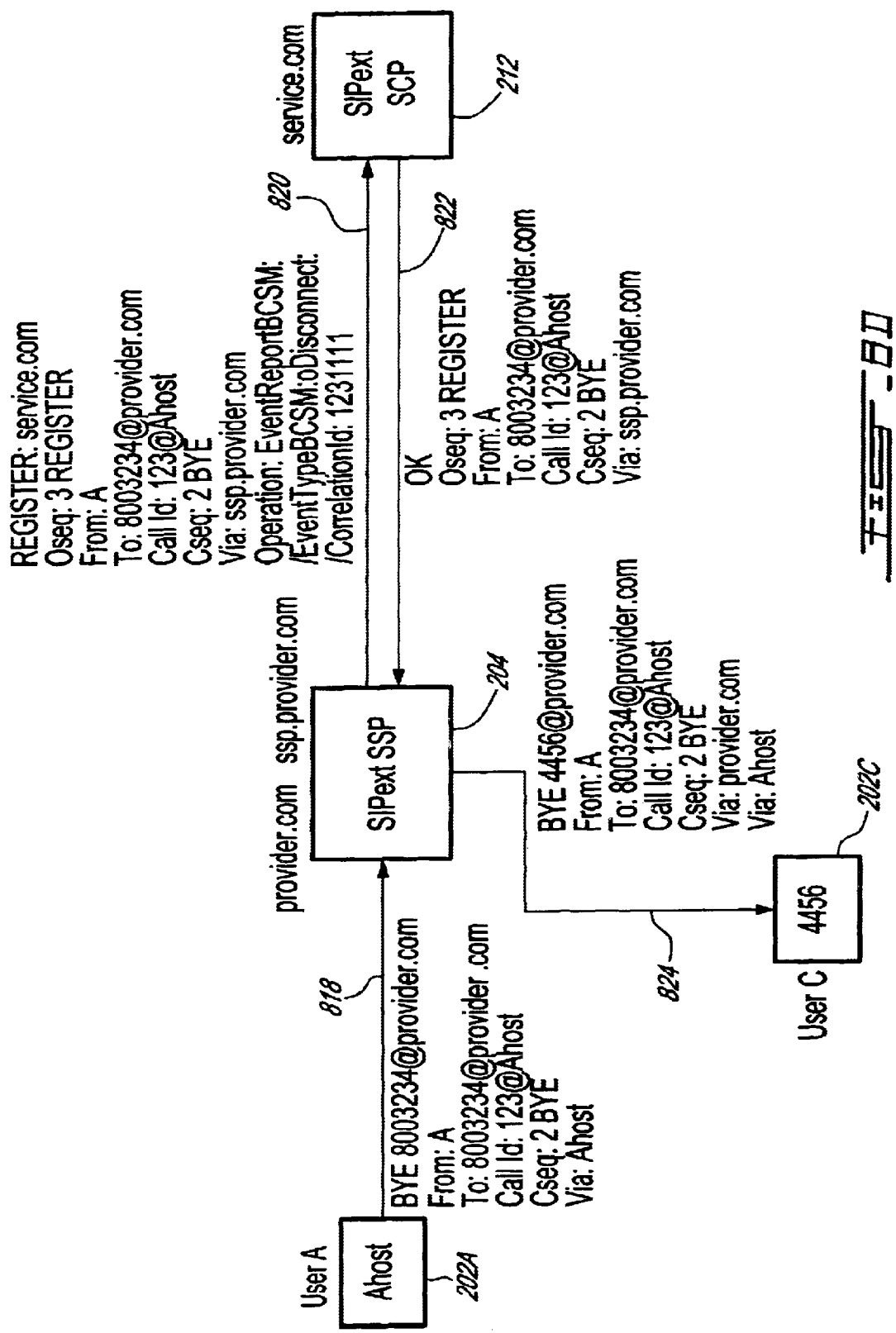

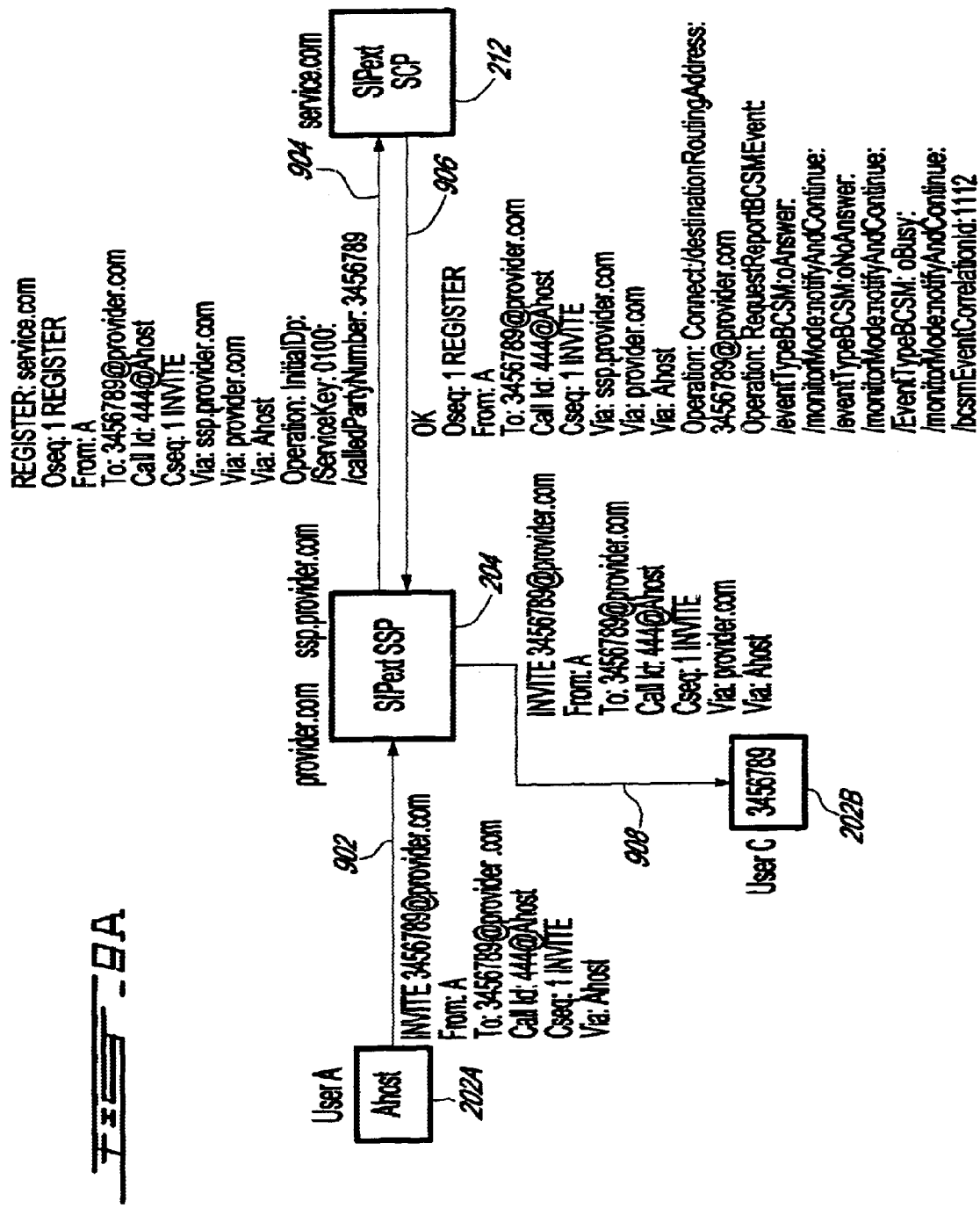

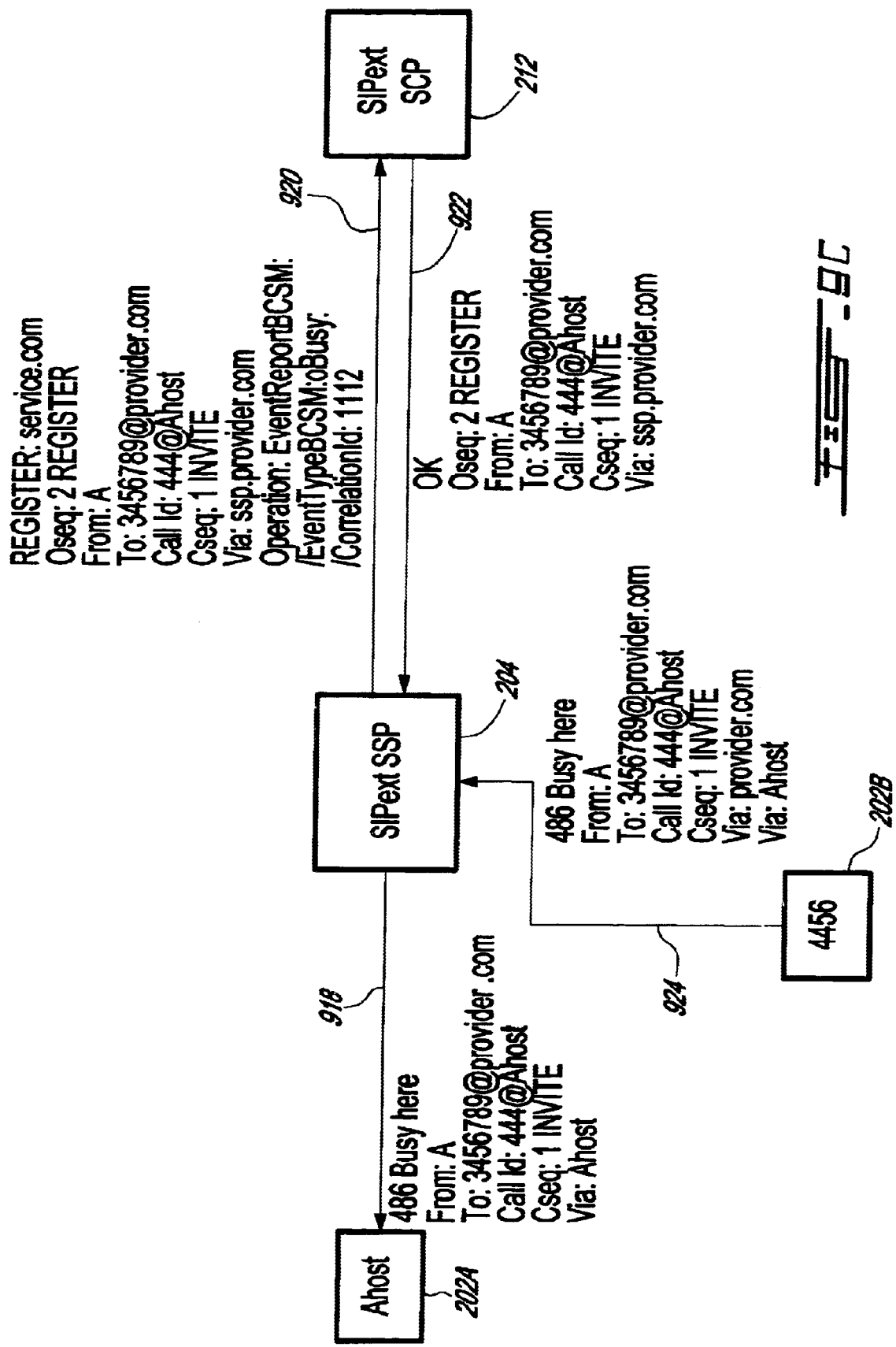

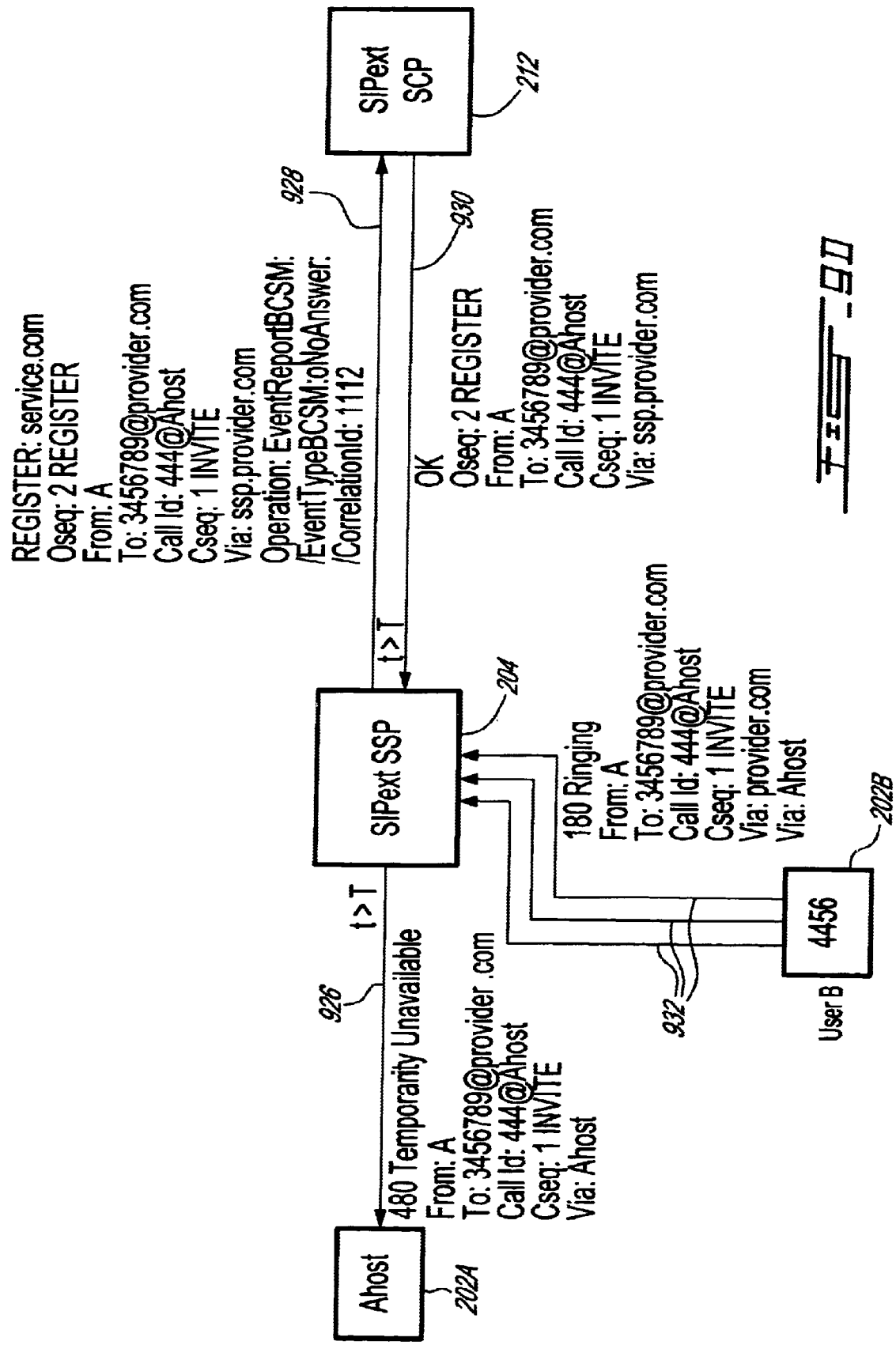

SYSTEM AND METHOD FOR PROVIDING VALUE-ADDED SERVICES (VAS) IN AN INTEGRATED TELECOMMUNICATIONS NETWORK USING SESSION INITIATION PROTOCOL (SIP)

PRIORITY STATEMENT UNDER 35 U.S.C §119 (e) & 37 C.F.R. §1.78

This nonprovisional application claims priority based upon the following prior U.S. provisional patent application entitled: "System and Method for Providing Value-Added Services in IP Telephony," Ser. No. 60/140,013, filed Jun. 18, 1999, in the names of: Roch Glitho, Christophe Gourraud, and Evelina Evloguieva.

BACKGROUND OF THE INVENTION

1. Technical Field of the Invention

The present invention relates to integrated telecommunication systems and, more particularly, to a system and method for provisioning Intelligent Network (IN)-based Value-Added Services in an integrated telecommunications network which includes a packet-switched network (PSN) portion operable with Session Initiation Protocol.

2. Description of Related Art

Coupled with the phenomenal growth in popularity of the Internet, there has been a tremendous interest in using packet-switched network (PSN) infrastructures (e.g., those based on Internet Protocol (IP) addressing) as a replacement for, or as an adjunct to, the existing circuit-switched network (CSN) infrastructures used in today's telephony. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Some of the market drivers that impel the existing Voice-over-IP (VOIP) technology are: improvements in the quality of IP telephony; the Internet phenomenon; emergence of standards; cost-effective price-points for advanced services via media-rich call management, et cetera. One of the emerging standards in this area is the well-known Session Initiation Protocol (SIP), developed by the Internet Engineering Task Force (IETF) for multimedia communications over PSNs. Using SIP, devices such as personal computers can inter-operate seamlessly in a vast inter-network, sharing a mixture of audio, video, and data across all forms of PSNs which may interface with CSN portions.

As is well-known in the telecommunications industry, services and service provisioning are the raison d'être of a telecommunications network, including VoIP networks. Services are typically categorized into (i) "basic services" (i.e., services which allow basic call processes such as call establishment and termination) or (ii) "advanced services" which are also commonly referred to as Value-Added Services (VAS). Examples of advanced services include split charging, 800-services, credit card calls, call forwarding, hunt group, et cetera. It is also well-known that advanced services operate as factors for market differentiation and are crucial for network operators' (or service providers') success.

Value-Added Services in SIP-based VoIP networks are known as "standard telephony services" whose architecture draws quite heavily on the Internet's "end-to-end" paradigm and focuses on service creation. While service provisioning schemes based on SIP's service architecture offer certain strengths (e.g., flexibility in role mapping for realizing services with end-to-end connectivity and having intelligence distributed to the "edges" of the network), there exist several disadvantages and drawbacks. For instance, in SIP, service logic is provided to be co-located with the SIP-based IP telephony entities. Accordingly, in current implementations, SIP-based networks do not have the capability to effectively access remote service logic, e.g., Intelligent Network (IN)-based logic, that is already deployed in the market and geared to provide an array of customer-validated VAS. Moreover, if the IN-based service logic were to be used today in the context of SIP, SIP-based entities would need to support IN protocols (i.e., IN Application Protocol (INAP) over Signaling System 7 (SS7) or over IP) in order to remotely access the IN service node (e.g., Service Control Point or SCP) containing the service logic.

Those skilled in the art should readily appreciate that a significant part of the problem in providing remote service access capability to SIP-based entities stems from the fact that the two protocols, SIP and IN, follow different approaches and cannot be easily combined harmoniously. As is well-known, SIP is a lightweight, text-based protocol designed for Internet applications where space efficiency is of little concern. On the other hand, IN protocols are binary (i.e., coded in the Abstract Syntax Notation or ASN) and optimized for providing a large variety of VAS with parameters provided in rather complicated data structures. Using IN protocols to remotely access service logic in the context of SIP-based networks, accordingly, implies imposing additional functionality on IP telephony entities and introducing an extra category of "heavyweight" protocols in the network environment.

Based on the foregoing, it should be apparent that there has arisen an acute need for a service provisioning solution which advantageously provides remote service access capability within a SIP-based telecommunications network. The present invention provides such a solution.

SUMMARY OF THE INVENTION

In one aspect, the present invention is directed to a method of providing a Value-Added Service (VAS) in a telecommunications network operable with Session Initiation Protocol (SIP). The telecommunications network includes a SIPext SSP server, a trigger server, and a service node supporting VAS that is operable with Intelligent Network Application Protocol (INAP). Before processing a call (originating or terminating) between two users, which is effectuated by receiving a request message in the SIPext SSP server, the SIPext SSP server consults a user profile stored in the trigger server when a message for a user subscribed with a service provider arrives thereat. While processing the call, upon encountering an armed detection point for the subscribed service, a SIP register request is formulated by the SIPext SSP server based on the user profile obtained from the trigger server. The register request preferably includes at least one header field which contains information specifying an operation that the service node is to perform with respect to the VAS. The header field further includes call context data associated with the call initiated by the first user.

Subsequently, the register request is transmitted by the SIPext SSP server to the service node which launches the SLP based on the operation specified in the header field and the call context data associated therewith. The service node then formulates a SIP response message and transmits it to the SIPext SSP server, the response message including a header field and a return result obtained in response to the execution of the SLP by the service node. The SIPext SSP server executes an action responsive to the header field and the return result in the response message received from the service node, wherein the action corresponds to the provisioning of the VAS. In an exemplary embodiment, the return result comprises a destination routing number for a call forwarding service subscribed by the second user.

In another aspect, the present invention is directed to an integrated telecommunications network for providing a Value-Added Service (VAS). The integrated telecommunications network comprises a SIPext SSP server which includes a proxy server and a service switching part. In one exemplary embodiment, the proxy server and the service switching part are addressable by two separate Internet Protocol (IP) addresses. The proxy server is provided for receiving a call initiation message from a first user with respect to a second user. The service switching part is included for determining if the second user has a subscription for the VAS. A trigger server containing user profiles associated with the VAS is also included in the telecommunications network. Also, the service switching part is provided with the capability for formulating a register request based on user profile information for the second user retrieved from the trigger server, wherein the register request includes a header field containing an operation associated with the VAS. The telecommunications network further includes a service node which contains an Intelligent Network Application Protocol (INAP)-compliant Service Logic Program (SLP) associated with the VAS and a SIPext SSP interface server for receiving and interpreting the register request from the service switching part. Preferably, the service node executes the SLP based on the contents of the header field in the register request received from the service switching part.

BRIEF DESCRIPTION OF THE DRAWINGS

A more complete understanding of the present invention may be had by reference to the following Detailed Description when taken in conjunction with the accompanying drawings wherein:

FIG. 2 depicts a functional block diagram of the architecture of an exemplary integrated communications network wherein IN-based service logic (i.e., SCP) is advantageously accessed from a SIP-based network portion by utilizing Extended SIP (ESIP or SIPExt) structures provided in accordance with the teachings of the present invention;

FIG. 3A depicts a functional message flow diagram which illustrates the basic operation of an integrated telecommunications network provided in accordance with the teachings of the present invention;

FIGS. 3B and 3C depict a flow chart illustrating the steps involved in the basic operation of Extended SIP messaging used in an integrated telecommunications network;

FIGS. 8A–8D depict various message flow diagrams for providing an exemplary Value-Added Service in an integrated communications network in accordance with the teachings of the present invention; and FIGS. 9A–9E depict various message flow diagrams for providing another exemplary VAS in an integrated communications network in accordance with the teachings of the present invention.

DETAILED DESCRIPTION OF EMBODIMENTS

Figure 1:
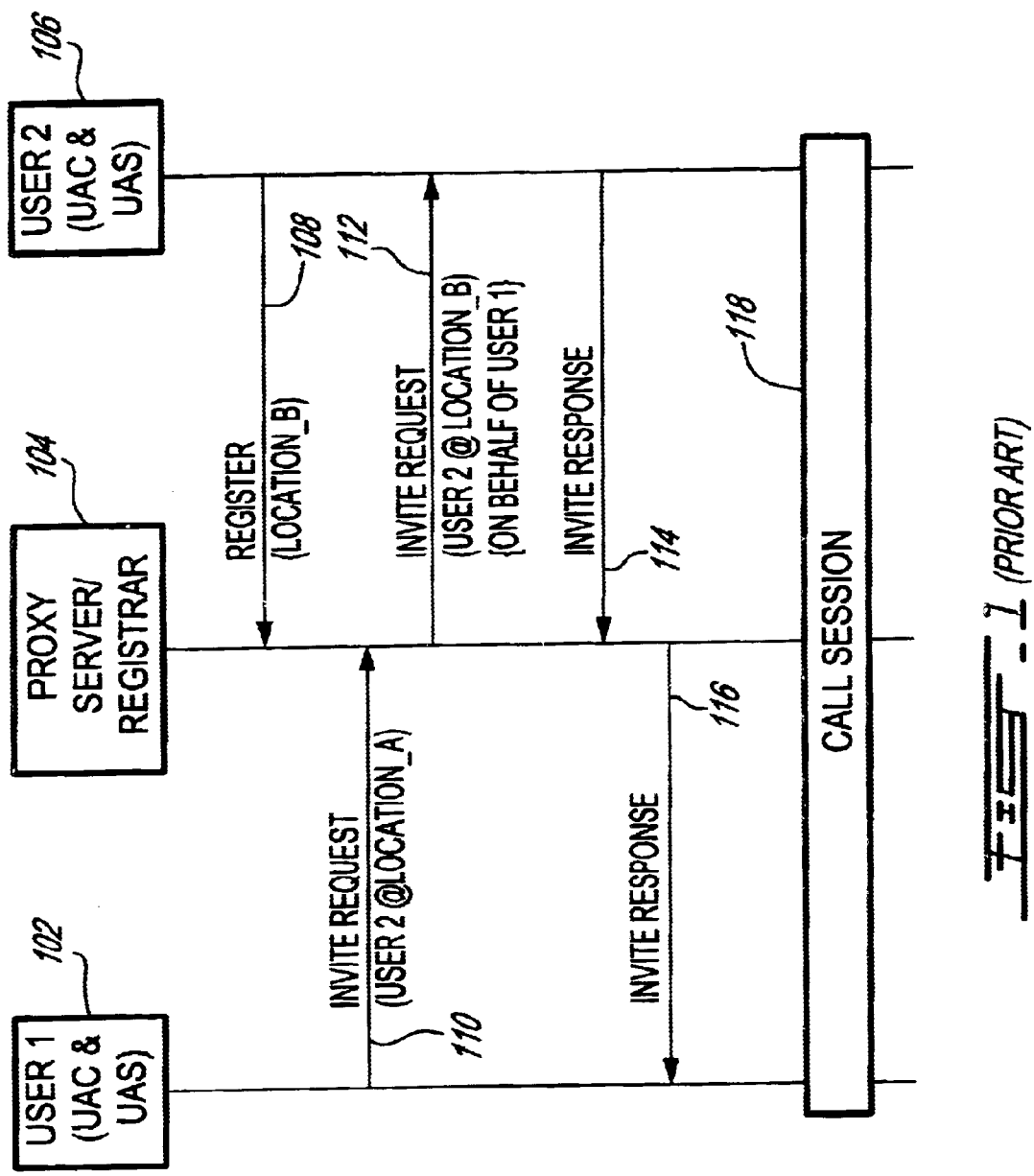
FIG. 1 (Prior Art) depicts a simplified message flow diagram for an exemplary call setup scenario in a conventional SIP-based network.

In the drawings, like or similar elements are designated with identical reference numerals throughout the several views, and the various elements depicted are not necessarily drawn to scale. Because the teachings of the present invention are particularly exemplified in the context of SIP-based messaging, a brief description thereof is set forth hereinbelow.

SIP is an application-layer control protocol that can establish, modify, and terminate multimedia sessions or calls with one or more participants. These multimedia sessions include, for example, multimedia conferences, multimedia distribution, distance learning, Internet Telephony, and similar applications. Members in a session, typically denoted as users, can communicate via multicast or via a mesh of unicast relations, or a combination of both.

SIP can invite both persons and "robots," such as a media storage service to a session. Typically, SIP invitations used to create sessions carry session descriptions which allow participants to agree on a set of compatible media types. Also, SIP can be used to initiate sessions as well as invite members to sessions that have been advertised and established by other means. For example, SIP sessions can be advertised using multicast protocols such as Service Advertising Protocol (SAP), electronic mail, news groups, World-Wide Web (WWW) pages, directory access protocols such as Lightweight Directory Access Protocol (LDAP), among others.

SIP makes minimal assumptions about the underlying transport and network-layer protocols. The lower layers can provide either a packet or a byte-stream service, with reliable or unreliable service. In the Internet context, SIP is able to use both User Datagram Protocol (UDP) and Transport Control Protocol (TCP) as transport protocols, among others.

In a SIP-based telephony network, users place calls via entities known as user agent clients (UACs) and receive calls via user agent servers (UASs). Accordingly, a SIP "user" is identified by a particular combination of a UAC and its associated UAS. Also, usually, there may be intermediate servers between a calling party UAC and the called party UAS. Some of the relevant SIP entities are briefly defined hereinbelow:

User Agent Client: Also known as a calling user agent. It is an application which initiates a SIP request.

User Agent Server: Also known as a called user agent. It is an application which contacts the end-user when a SIP request is received. Also, it returns a response on behalf of the user since the user may select to accept, reject, or redirect the request.

Proxy or Proxy Server: It is an intermediary application which acts as a client as well as a server for the purpose of making requests on behalf of other clients. As a server, it receives SIP requests from other SIP entities. It either services the requests internally or acts as a client towards other servers in order to get the requests serviced. A proxy interprets and, if necessary, rewrites a request message before forwarding it.

Redirect Server: It is an application which accepts a SIP request, maps the address into one or more new addresses and returns these addresses to the client. Unlike a proxy server, it does not initiate its own SIP request. Also, unlike a UAS, it does not accept calls.

Registrar: A registrar is a server that accepts REGISTER requests. It may typically be co-located with a proxy or redirect server. Essentially, it operates as an application which allows end-users to register their current location.

The basic protocol functionality and its operation is summarized in the following. Calling parties (also referred to as "callers") and called parties (also referred to as "callees") are identified by SIP addresses which point to "objects" on a network. The objects are "users at hosts," having appropriate SIP Universal Resource Locators (URLs) as addresses. The SIP URL typically takes a form similar to a mailto or telnet URL, i.e., user@host. The user part is generally provided as a user name or a telephone number. The host part typically comprises a domain name having a Domain Name System (DNS) Server Name, CNAME, or a numeric network address, among others.

The client-server approach of the SIP methodology employs a text-based messaging scheme. A SIP message is either a request from a client to a server, or a response from a server to a client. Both types of messages typically comprise a start-line, one or more header fields (also known as "headers"), an empty-line (i.e., a line with no text before a carriage-return line-feed (CRLF)) indicating the end of the header fields, and an optional message body.

```
A SIP Request message format is usually as follows:
Request = Request-Line
          * (general header
          | request-header
          | entity-header)
          CRLF
          [message-body]
```

After receiving and interpreting a Request message, a recipient (or sender) responds with a SIP Response message having a format shown below:

```
Response = Status-Line
           * (general header
           | response-header
           | entity-header)
           CRLF
```

The Request-Line of a SIP Request message begins with a method token which allows a particular procedure or action from the requesting entity or the recipient(s) (or sender(s)) of the Request message. The following methods are currently implemented in SIP:

INVITE: used to request connection establishment.
ACK: allows clients to confirm that they have received a final response to an INVITE Request.
BYE: used to request connection termination.
OPTIONS: used to query servers with respect to their capabilities.
REGISTER: conveys information about user location.
CANCEL: cancels pending Requests.

The header fields in SIP messages are provided for characterizing or further defining a particular end-to-end or hop-by-hop message and the participating entities. General header fields apply to both Request and Response messages. The "entity-header" fields define meta-information about the message-body or, if no body is present, about the resource identified by the message. The "Request-header" fields allow the client (i.e., the requesting entity) to pass additional information about the Request, and about the client itself, to the server. These fields act as Request message modifiers. The "Response-header" fields allow the server to pass additional information about the response which cannot be placed in the Status-Line. These header fields include information about the server and about further access to the resource or resources identified in the Request message.

Depending upon the method token used in the message, the header fields are defined as "required" (i.e., mandatory), "optional," and "not applicable." Some of the mandatory header fields, regardless of the method token, are: "Call-ID", "Cseq" (Command Sequence), "From", "To", and "Via", among others. An example of an optional header is the "Require" header field used by clients to inform UASs about the options that the client expects the server to support in order to properly process its Request. Whereas end-to-end headers are transmitted unmodified across all proxies, hop-by-hop headers may sometimes be modified by the proxies encountered in the hops.

Header fields follow a generic format wherein each header field consists of a name followed by a colon (":") and the field value. Field names are typically case-insensitive, while their values may be. A common form of the header fields is set forth below:

```
message-header = field-name ":" [field-value] CRLF
   field-name = token
   field-value = * (field-content | Leading White Space)
   field-content = < the OCTETS making up the field-value and others >
```

A typical SIP transaction in a conventional IP network may be exemplified by referring to FIG. 1, wherein a simplified message flow diagram for a call setup scenario is depicted. A proxy server 104 is co-located with a SIP registrar for allowing users to register therewith. User-1 102 (shown as a combination of a UAC and UAS) and User-2 106 (also provided as a combination of a UAC and UAS) are provided as the participants in this call setup scenario. It is further assumed in this example that User-1 102 is the calling party and User-2 106, the called party with the SIP URL user2@location-A, has moved to a new location user2@location-B.

First, the UAC of User-2 106 registers its new location with the registrar co-located with the proxy server 104 by sending a REGISTER message 108. The SIP URL associated with of the new location is provided as part of the REGISTER message 108. Thereafter, when the UAC of User-102 sends an INVITE Request message 110 with user2@location-A as the destination address, the proxy server 104 obtains the new address of User-2 106 from the registrar and sends an INVITE Request message 112 to User-2 on behalf of the calling party. In response, User-2 sends an INVITE Response 114 which is forwarded by the proxy server 104 to User-1. It should be understood by those of ordinary skill in the art that other SIP messages such as, for example, the ACK messages, are not shown in this simplified message flow diagram. After receiving the INVITE Response message 116 from the proxy 104 by the calling party, a Call Session 118 may then be established between User-1 and User-2.

Whereas the brief overview of SIP functionality and messaging operation provided hereinabove is believed to set forth a proper and adequate framework for the present invention, additional details may be found in the Internet Draft ietf-mmusic-sip-11.txt promulgated by the IETF and located at <http.://www.-ietf.org/internet-drafts/draft-ietf-mmusic-sip-11>. This Internet Draft is incorporated by reference herein.

Referring now to FIG. 2, depicted therein is a functional block diagram of the architecture of an exemplary integrated telecommunications network 200 wherein IN-based service logic is advantageously accessed from a SIP-based network portion. In accordance with the teachings of the present invention, SIP messaging formats are extended so that SIP servers are provided with the capability to access the service logic stored in IN-based nodes (i.e., SCPs). Essentially, the SIP servers and SCP nodes are provided with service switching interfaces that interact and operate based on the extended SIP messaging, referred to as SIPext messaging hereinafter. Further, according to the extended SIP messaging scheme set forth herein, clients are expected to include an appropriate extension name in a Require header field when using the extensions of the present invention.

The integrated communications network includes one or more users as combinations of pure SIP UACs and UASs. For example, two users, User A 202A and User A 202B, are illustrated in the architecture shown in FIG. 2. A trigger server 206 is provided for storing user profiles which contain, for example, lists of services for which users have subscriptions.

One or more SIPext Service Switching Point nodes (SSPs) (for example, SIPext SSP node 204 operating as a switching node) are provided within the integrated communications network 200 for interacting with the various users and trigger server or servers of the SIP network portion. Further, the SIPext SSP 204 is provided with the capability to interact with an IN service node in a manner described in greater detail hereinbelow.

In a presently preferred exemplary embodiment of the present invention, the SIPext SSP node 204 is comprised of two functional parts: a SIP server part 208 and a SIPext Service Switching part 210, each of which may be separately IP-addressable. The SIP server part 208 preferably operates as a pure SIP proxy server and provides the basic call services, that is, call setup and call termination. The SIPext Service Switching part 210 is provided as a SIPext server that operates as an IN SSP. The SIPext Service Switching part 210 preferably provides the following functionality:

trigger detection;

sending SIPext Request messages to an IN SCP for triggering appropriate Service Logic Program (SLP) execution;

sending Requests and Responses for interaction with an already running SLP;

receiving and interpreting SIPext Requests or Responses from an SCP; and transferring control to the SIP server part 208 for performing related SIP signaling.

In accordance with the teachings of the present invention, an IN SCP is also provided with the functionality of a SIPext server 214 (preferably operating as a SIPext SSP interface server), thereby becoming a SIPext SCP node 212. The SIPext server 214 of the SIPext SCP node 212 preferably performs the following:

providing for the communication with the SIPext SSP 204;

interpreting SIPext messages;

transferring control to one or more IN SLPs (e.g., SLP 216); and formulating appropriate SIPext messages.

As mentioned in the foregoing, the SIPext SSP node 204 may preferably be provided with two IP-addresses, IP ADDR1 209 and IP ADDR2 211. It should be readily appreciated by one of ordinary skill in the art that IP ADDR1 209 corresponds to the pure SIP part, i.e., the SIP server 208, responsible for the call setup between the end parties. The other IP-address, IP ADDR2 211, corresponds to the Service Switching part 210 of the SIPext SSP 204. In the examples described in greater detail hereinbelow, these two IP addresses are denoted as "provider.com" and "ssp.provider.com", respectively.

It should be realized that having two separate addresses makes it possible to distinguish between SIPext-SCP messages and those associated with the pure SIP network nodes. For example, a Response message sent to the pure SIP part (i.e., SIP server 208) of the SIPext SSP node 204 means that the message needs to be processed as part a basic call service. On the other hand, if a Response message is sent to the Service Switching part 210 of the SIPext SSP 204 using the IP ADDR2 211, that message is to be interpreted and processed according to SIPext rules.

Those skilled in the art should understand that it is also possible for the SIPext SSP node 204 to have only one IP address. However, this condition would require that the SIPext messages be distinguished from the pure SIP messages. It should be apparent that the Require: header field may be used to specify the type of messaging and, for example, by providing Require. inap.sip in the message header, the SIPext SSP 204 may be notified that the message is a SIPext message to be processed by the SIPext Service Switching functionality part 210. Clearly, this approach requires that all messages directed to the IP address of the SIPext SSP node 204 be first classified by their Require: header.

FIG. 3A depicts a functional message flow diagram which illustrates the basic operation of an integrated communications network provided in accordance with the teachings of the present invention. User A 202A places a call to User B 202B using a pure SIP message, INVITE 302. When the message is received in the SIPext SSP node 204, the SIPext SSP node queries or consults with the trigger server 206 via a suitable IP message 303 to obtain user profile information pertaining to User B 202B. While processing a call, upon encountering an armed detection point for the subscribed service, the SIPext SSP node 204 formulates a suitable SIPext request message 304 and forwards it to the service node, SIPext SCP 212. As will be explained in greater detail hereinbelow, the SIPext message 304 is a SIP-compatible message with additional header/field information specifying the service trigger to be handled the service node 212. Preferably, the SIPext request messages take the form of SIP REGISTER messages with INAP-compliant service-related information in the additional headers and fields. Analogously, SIPext responses assume the form of suitable SIP messages with additional headers and fields also.

Continuing to refer to FIG. 3A, upon receiving the SIPext REGISTER message 304, the service node 212 performs the service specified therein and provides a SIPext OK response 306 to the SIPext SSP node 204 if the SLP is successfully executed. Responsive to the SIPext OK response, the SIPext SSP node analyzes its header fields which specify what the SIP Server part of the SIPext SSP node 204 should do. Accordingly, the SIP Server routes the call using a pure SIP message 308, based on the results obtained from the SLP in the service node 212.

In the exemplary SIPext operation described above, it is possible that the SLP may not be successfully executed for some reason and, consequently, an error message may be generated by the service node 212. Upon receiving the error message, the SIPext SSP node 204 may reformulate the REGISTER message and forward it to the service node again, return an error response to User A 202A, or perform some other action.

Figure 3B:
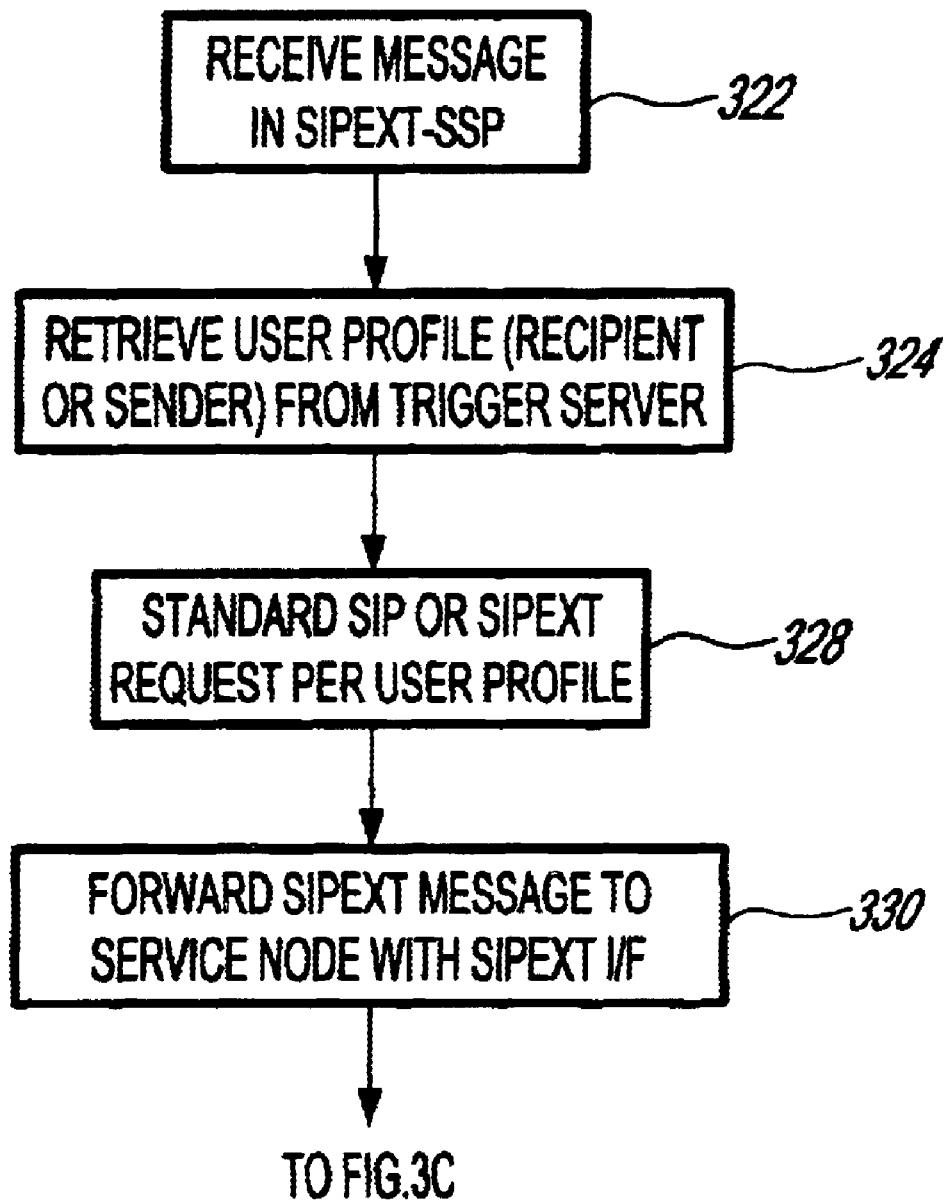

FIGS. 3B and 3C depict a flow chart of the steps involved in the basic SIPext operation described hereinabove. Upon receiving a message in the SIPext SSP node (step 322), the SIPext SSP node retrieves the user profile of the recipient (or sender) (step 324). Based on the user profile information obtained from the trigger server, the SIPext SSP node may behave as a standard SIP server or formulate a SIPext request message (step 328) and transmits it to a service node with an appropriate SIPext interface, wherein the service node is capable of executing SLPs associated with VAS (step 330).

Upon receiving the SIPext request message from the SIPext SSP node, the service node interprets the information provided in the request message to construct a suitable INAP instruction (step 332) that launches the execution of one or several SLPs (step 334). Thereafter, the service node transmits the results (including error messages, if any) obtained from the SLP operation (i.e., successful execution, non-execution, or partial execution, etc.) to the SIPext SSP node in a SIPext response message (step 336). Subsequently, the SIPext SSP node takes an appropriate action (call routing, error reporting, reformulating the SIPext request message, etc.) on the basis of the result information received from the service node (step 338). Thereafter, the process flow associated with the basic SIPext operation ceases (step 340).

The structure of the SIPext header fields for SIPext messaging in accordance with the teachings of the present invention is now set forth immediately hereinbelow. Those skilled in the art should appreciate that the extension of SIP messages as provided herein advantageously allows the use of SIP as a protocol for communication between SIP entities and IN-based SCPs. Further, the SIPext messaging provides a useful Internet implementation of INAP such that the benefits of integrating PSNs and CSNs in the context of telecommunications may be expeditiously realized.

In a presently preferred exemplary embodiment of the present invention, the following four header fields are defined:

Operation:

The Operation: header field advises the recipient (or sender) entity to perform the operation specified in the content of the header. In addition to the name of the operation, the header may preferably contain the parameters of the operation, if any. Further, the operation and the parameters' name, type, and value correspond to those defined in INAP.

The format of the Operation header field in the Backus-Naur form (i.e., BNF notation) is given below:

Operation="Operation" ":" name-operation";"
 [operation-param]
name-operation=1*alpha
operation-param=*("parameter" ":"parameter-value";")
parameter=*(/(1* alpha))
parameter-value=*DIGIT|*CHAR|boolean|*OCTET Some of the examples of this header field and the translation of INAP data structures (used for the header arguments) in accordance with the teachings of the present invention are set forth later on hereinbelow.

Result-op:

The Result-op: header field carries the result(s) of the successful execution of an operation. This header is preferably present in the response message only, if the operation requires that the result(s) of the operation be sent back to the entity that invoked the operation (i.e., SIPext SSP node or SIPext SCP, for example).

The format of the Result-op: header in the usual BNF notation is given below:

Result-op="Result-op"":" [result-arguments]
result-arguments *("argument" argument-value ";")
argument=*(/1*alpha))
argument-value=*DIGIT|*CHAR|boolean|*OCTET
Example: Result-op:/digitsResponse:456;

This example shows the result returned after the execution of ReceivedInformation operation and represents an instance of the ReceivedInformationArg parameter.

Error-op:

The Error-op: header field is used to convey information regarding an unsuccessful operation and the reason or reasons therefor.

The BNF format of the Error-op: header is:

Error-op="Error-op" ":" error-name";" [*(error-parameters [":"
parameter-value)] ";"]
error-name=1*alpha
error-parameters=*(1*alpha)
parameter-value *DIGIT|*(1* alpha)

Some of the examples of the Error-op: header field usage are below:

Error-op: CancelFailed; problem:unknownOperation; operation:654
Error-op: MissingParameter;

Oseq:

In a presently preferred exemplary embodiment, the SIPext node that generates a SIPext REGISTER request adds the Oseq: header field to every request. The contents of this field represent the order of the operation requests sent for a specific Call-Id such that the operations are preferably executed in the same order. The Oseq: sequence number is also used to match the responses to the requests.

The format of the Oseq: header field is as follows:

Oseq="Oseq"":" 1* DIGIT "REGISTER"
Example: Oseq: 3REGISTER

Based on the foregoing discussion, it should be apparent that the contents of the Operation: header field provided in accordance with the teachings of the present invention essentially control the SIPext functionality between two SIPext entities such as, for example, the SIPext SSP node 204 and the SIPext SCP 212 depicted in FIG. 3A. As briefly alluded to hereinabove, the arguments in the Operation: header field dictate the context of the operation and preferably correspond to the parametric information necessary for executing INAP-compatible operations by the receiving entity.

The INAP parametric information is optimized for supporting a large variety of VAS and, consequently, is specified in the Abstract Syntax Notation-1 (ASN.1 format) which is well suited for a "heavyweight" protocol (such as INAP) requiring rather complicated data structures like nested formats, uni- and multi-dimensional trees, etc. for representing numerous optional elements. However, those skilled in the art should appreciate that the text-based parameter-value structure of the Internet application protocols, including SIP, are optimal where the parameters are not heavily structured and values are typically provided as simple lists. Accordingly, the present invention advantageously provides a solution for representing INAP-compatible parametric information in a linear format that is highly efficient for a "lightweight" Internet application protocol such as SIP in the form of SIPext messaging.

Figure 4A:
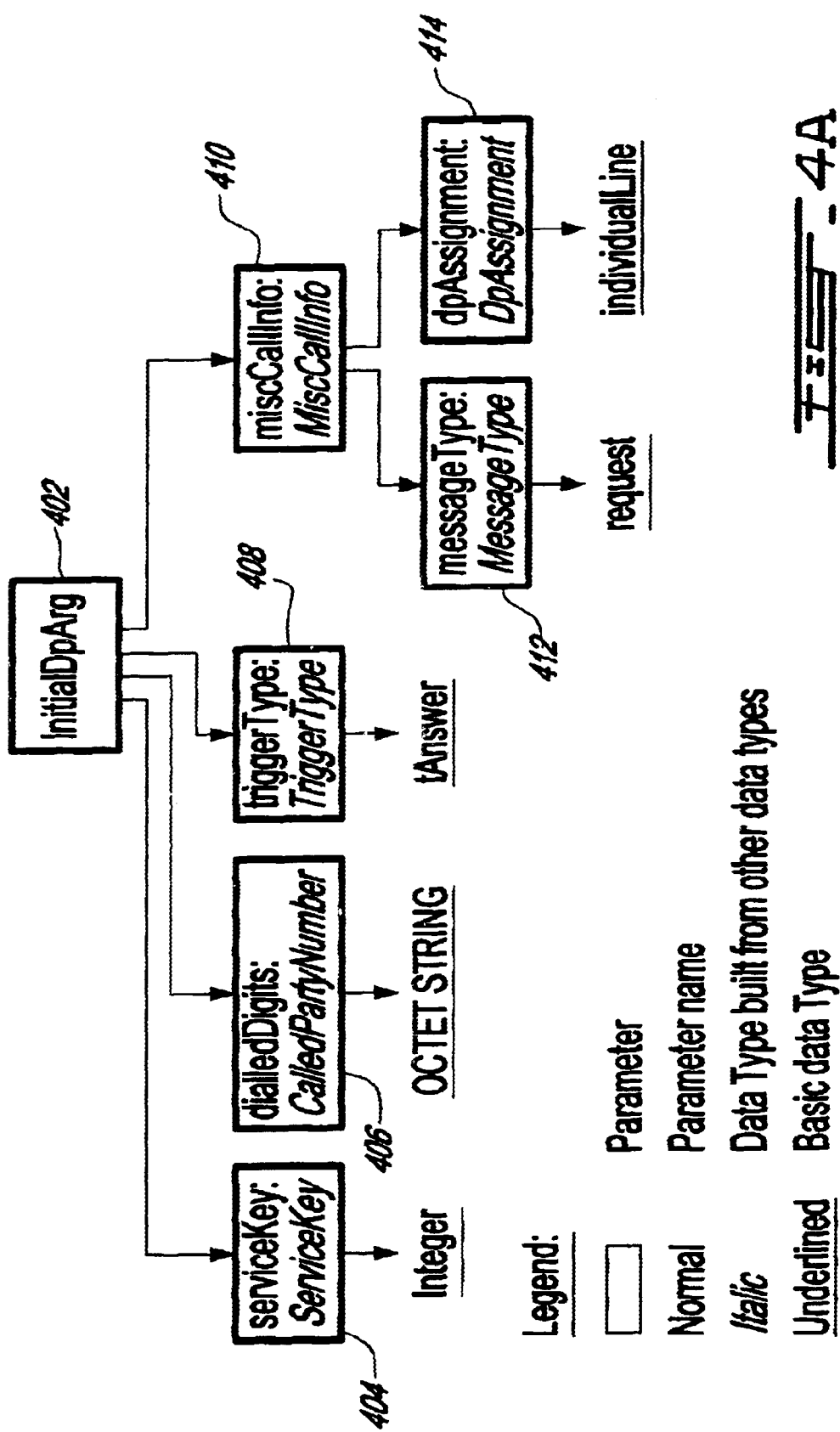
FIGS. 4A and 4B depict exemplary INAP tree data structures for providing parametric data.
Figure 4B:
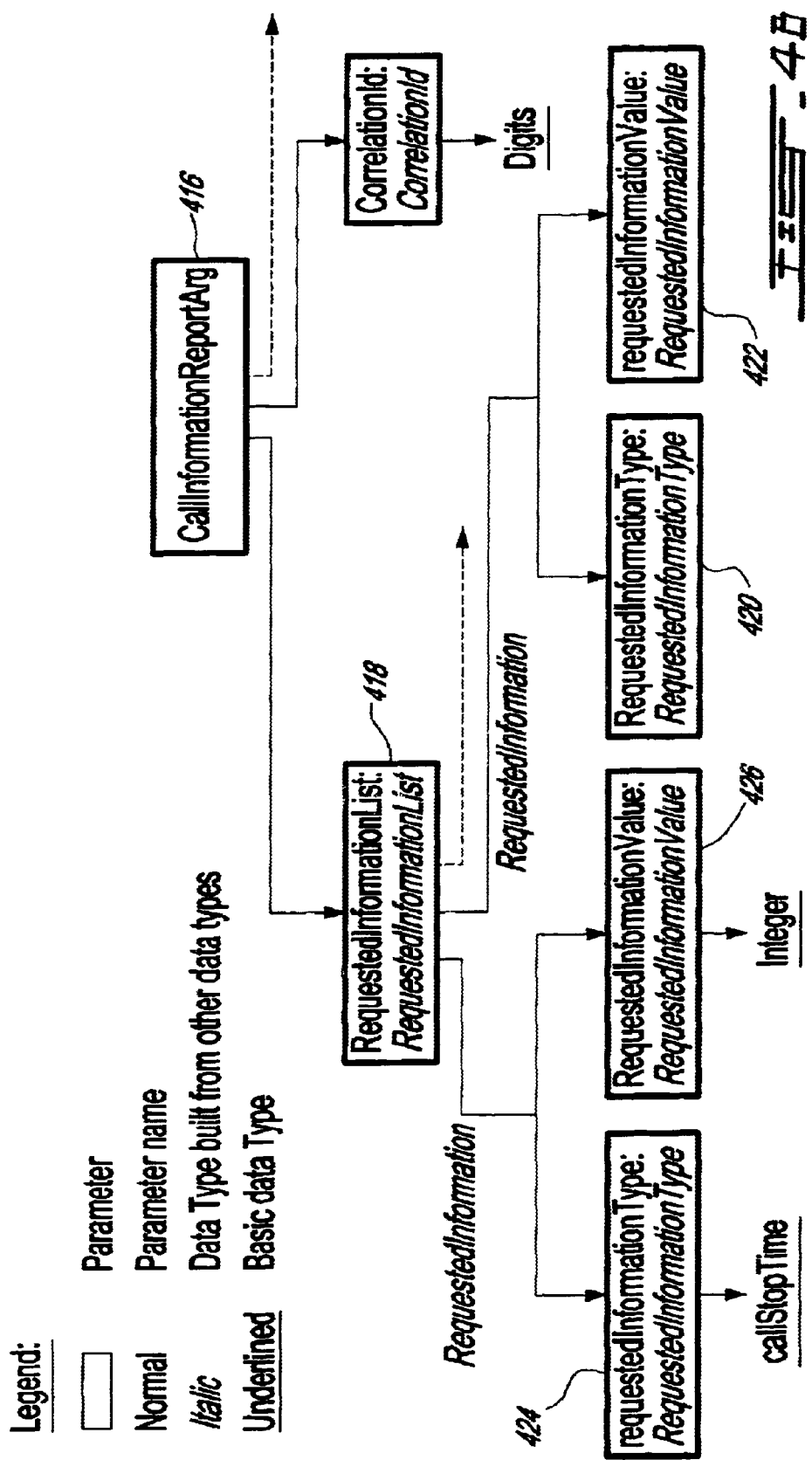

Referring now to FIGS. 4A and 4B, depicted therein are two exemplary operation arguments that illustrate the tree data structures of INAP. In FIG. 4A, InitialDp operation argument 402 represents a uni-dimensional tree data structure. The following parameters are specified: serciceKey 404; dialedDigits 406; triggerType 408; and miscCallInfo 410 which is comprised of messageType 412 and dpAssignment 414.

A multi-dimensional tree data structure is exemplified by CallInformationReportArg 416 as illustrated in FIG. 4B. It can be seen that at each level in the data hierarchy, parameters have multiple paths, i.e., multiple origins in prior levels. A RequestedInformation List 418 is comprised of multiple requestedInformationvalue elements 422 and 426, and multiple requestedInformationType elements 420 and 424.

Regardless of the dimensionality of the tree data structure, the present invention provides two mechanisms for linearly describing the argument data. In one exemplary embodiment, the basic data types (i.e., the leaves in the tree) are identified with the full path of data types that are above them in the hierarchy of the argument data structure. This path, accordingly, explicitly describes their location in the argument data structure tree. The receiving entity is provided with the knowledge regarding the corresponding argument data structure and the data types it is made of.

The InitialDp operation argument 402 is thus represented in a linear format as follows:

/serviceKey:40,/dialedDigits:8876hjgda,/triggerType: oAnswer,

/miscCallInfo/messageType:request,

/miscCallInfo/dpAssignment: individualLine.

The CallInformationReportArg 416 may be described by the sequence:

/requestedInformationList/
  requestedInformationType:callStopTime,
/requestedInformationList/
  requestedInformationValue:457,
/requestedInformationList/
  requestedInformationType:callElapsedTime,
/requestedInformationList/
  requestedInformationValue:20,
/correlationId:111.

In a second exemplary embodiment, each basic data type is identified with one parameter name. In the example of the InitialDp operation argument 402, the parameters can be described with the following names:

/serviceKey:40,/dialedDigits:8876hjgda,/triggerType: oAnswer,

/messageType:request,/dpAssignment:individualLine.

In the example of the CallInformationReportArg 416, the following sequence specifies the parametric information:

/requestedInformationType:callStopTime,/
  requestedInformationValue:457,
/requestedInformationType:callElapsedTime,
  /requestedInformationValue:20,
/correlationId:111.

In the second approach, the entity interpreting the operation is required to match the parameter name with its location (field) in the linear data structure storing the data, in addition to possessing the knowledge regarding the argument data structure and its building data types.

Using either of the approaches set forth above for "linearizing" the INAP parametric information, it is possible to efficiently pack the VAS-related operations within the extended header fields of the SIPext messages in accordance with the teachings of the present invention. As set forth in the basic SIPext operation described with reference to FIGS. 3A–3C hereinabove, the functionality of the SIPext SSP node (acting as a client) typically includes formulating suitable SIPext REGISTER messages with appropriate extended header fields for executing IN-based SLPs. The receiving SIPext SCP node, accordingly, operates as a server towards the requesting SIPext SSP node.

The functionality of a SIPext SCP node as a server may now be described in greater detail, taking particular reference to the extended header field information set forth above. Upon receiving a SIPext REGISTER request, the SIPext SCP node checks whether the request comes from a SIPext SSP node by examining the topmost Via: header field. Using the Oseq: sequence number field, it determines whether the request needs to be processed next. The request may be postponed if there are other requests with smaller Oseq: numbers either in process queue or have not been received yet. Accordingly, the SIPext SCP node maintains a counter or other suitable mechanism for monitoring the number of the last request processed for every Call-Id.

Thereafter, the SIPext SCP node searches for Operation: header fields in the request. While all other headers (e.g., pure SIP headers which are not service related) and their contents remain unprocessed, the Operation: headers are parsed and, depending on the name or names of the operation(s), the corresponding INAP operation is performed using the linearized parametric data. For example, an SLP may be launched by the SIPext SCP node using such parametric data.

If the operation is executed successfully, an OK response is generated. The OK response may contain another Operation: header field or a Result-op: header field. Pure SIP headers not related to service are simply copied in the OK response. On the other hand, if the operation is not executed successfully, an INAP error message is generated which is translated by the SIPext SCP node into a SIP error response. An Error-op: header is included in the response specifying the INAP error and parameters associated therewith. The following table, Table I, gives examples of INAP errors and the corresponding SIP error responses used for transporting them to the SIPext SSP node.

TABLE I

| INAP ERRORS | SIP ERROR RESPONSES |
|---|---|
| MissingParameter | 400 Bad Request |
| ParameterOutOfRange | 400 |
| SystemFailure | 500 Server Internal Error |
| MissingCustomerRecord | 500 |
| TaskRefused | 400 |

TABLE I-continued

| INAP ERRORS | SIP ERROR RESPONSES |
| --- | --- |
| UnexpectedComponentSequence | 400 |
| UnexptectDataValue | 400 |
| UnexpectedParameter | 400 |
| RequestedInfoError | 400 |

Figure 5:
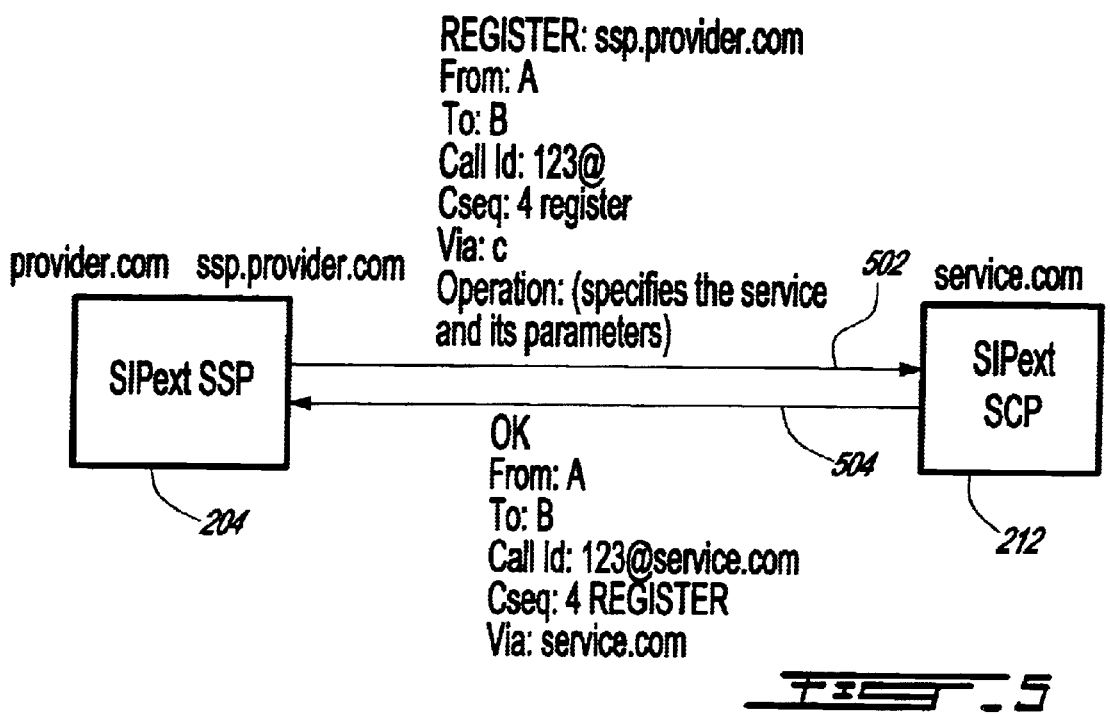
FIG. 5 depicts a functional message flow diagram illustrating the functionality of a SIPExt SCP node as a client.

In some instances, the SIPext SCP node may operate as a client by requesting the SIPext SSP node to execute an operation. Referring now to FIG. 5, depicted therein is a functional message flow diagram illustrating the functionality of a SIPext SCP node as a client. The SIPext SCP node 212 transmits a REGISTER message 502 to the SIPext SSP node 204 specifying the operation and its parameters in the Operation: header field. Generally, a REGISTER request sent by the SIPext SCP node 212 requires the execution of operations that are not related to the call setup and, accordingly, the header fields carry less information than the headers in the REGISTER messages transmitted by the SIPext SSP node as a client. Also, the requests sent by the SIPext SCP node 212 are used in general to instruct the SIPext SSP node 204 (which acts as a server) to perform some call monitoring and event notification actions.

After sending the REGISTER request 502, the SIPext SCP node 212 waits for a response message (e.g., OK response 504) from the SIPext SSP node 204. Once the response message is received, it is processed by the SIPext SCP node 212 to parse the Result-op: or Error-op: headers.

The functionality the SIPext SSP node is now described in greater detail, with particular reference to the header field information provided hereinabove. As shown in FIG. 2, the SIPext SSP node 204 is comprised of the SIP server 208 (using pure SIP messaging) which performs the basic call setup and termination, and the Extended SIP (ESIP) Service Switching (SS) part or module 210 which is responsible for the signaling communication with the SIPext SCP node 212. In the context of the present patent application, accordingly, the functionality of the ESIP SS module 210 of the SIPext SSP node is focused in particular when the functionality of the SIPext SSP node is addressed herein.

In general, the SIPext SSP node (and its ESIP SS module 210) functions as a client towards the SIPext SCP node, as explained above with respect to the basic SIPext operation depicted in FIGS. 3A–3C. The SS module sends requests to the SIPext SCP node in two situations: (i) when a trigger for a service is detected, or (ii) an event that needs to be reported to the SIPext SCP node. In a presently preferred exemplary embodiment of the present invention, the ESIP SS module 210 monitors all the INVITE messages sent to the pure SIP proxy server 208 of the SIPext SSP node 204 (shown in FIG. 2) in order to be able to detect service-based triggers. In the exemplary embodiment shown in FIG. 3A, the SIP proxy server 208 is identified with the IP address provider.com and the INVITE messages sent to this IP address are accordingly monitored by the ESIP SS module 210. If the recipient (or sender) of an INVITE message (i.e., User B 202B in FIG. 2) has a subscription for a VAS, the ESIP SS module 210 formulates the REGISTER request for the SIPext operation as follows:

Copies all the headers of the INVITE request so that the ESIP SS module may operate in a "stateless" mode (i.e., the SS module does not have to memorize the call state when the REGISTER request is sent to the SIPext SCP node).

Adds a Via: header field containing the address of the ESIP SS module.

Adds a Oseq: header containing the sequence number of the REGISTER request. This sequence number is used by the ESIP SS module to match the responses from the SIPext SCP node with its REGISTER requests. It is also used by the SIPext SCP node to execute the requested operations in a sequential order.

Adds one or more Operation: headers which specify the operation(s) to be executed by the SIPext SCP node, including the parametric information therefor that is linearized as described above.

Figure 6:
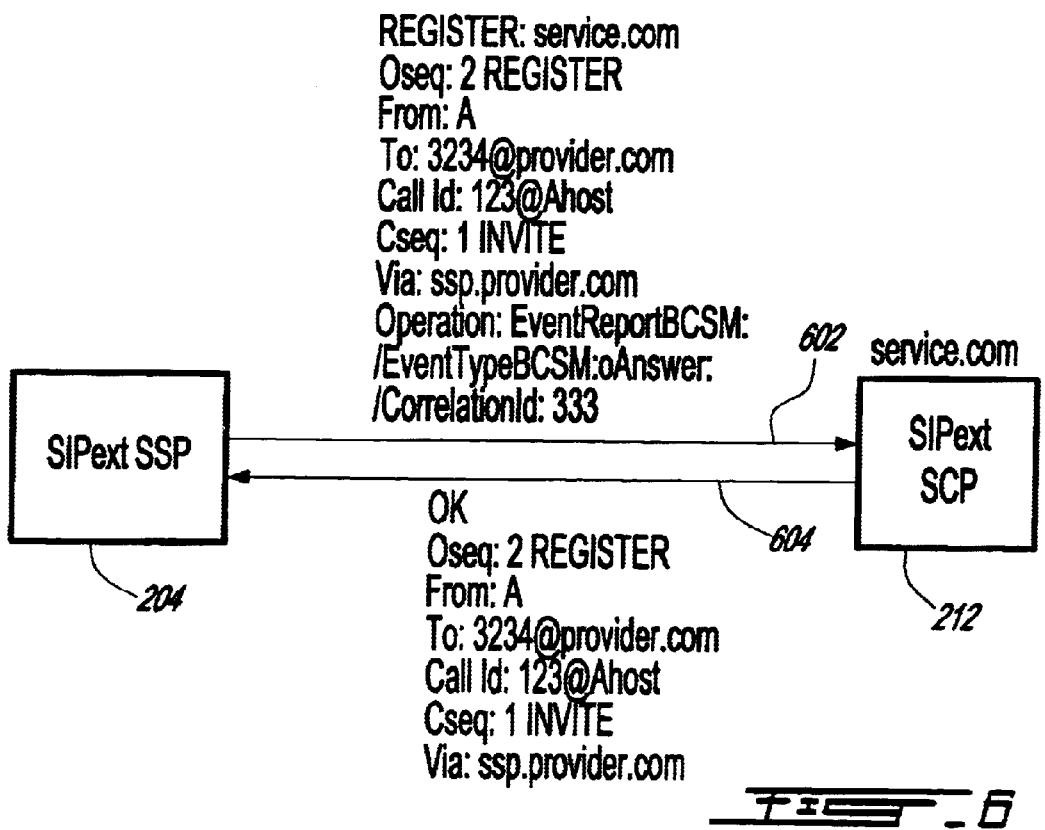
FIG. 6 depicts a functional message flow diagram illustrating the functionality of a SIPExt SSP component as a client, wherein an Extended SIP REGISTER message is forwarded to a SIPExt SCP node as result of event detection.

FIG. 6 depicts a functional message flow diagram illustrating the situation when a REGISTER request 602 is sent as a result of event detection. As can be appreciated by those skilled in the art, there may be some services which require that the ESIP SS module report to the SIPext SCP node the occurrence of some specific event. Accordingly, the ESIP SS module formulates the REGISTER request 602 with the header fields as follows:

To:, From:, Call-Id:, Cseq: headers are included for carrying the contents of a call context. In most cases, the contents of these headers are not used for the execution of the requested operation because, generally, all the call context data needed is present in the Operation: header.

Oseq: header is used for sequencing the requests as explained above.

Via: header is used for specifying that the request is generated by the ESIP SS module of the SIPext SSP node 204. For REGISTER requests that are generated due to event detection, typically there is only one Via: header.

Operation: header that specifies the operation to be executed and its parameters.

In response to the REGISTER request 602 requesting an operation to be performed by the SIPext SCP node 212, an OK message 604 may be transmitted back to the ESIP SS module of the SIPext SSP node 204 if the request 602 is successfully processed by the node 212. The OK response 604 preferably contains the SIPext Oseq: header and Operation: header, in addition to the following pure SIP headers: To:, From:, Call-Id:, and Via:. If the Operation: header is present, the ESIP SS module is required to perform the operation specified therein. For example, if the Operation: header indicates that the call has to be routed to a call forwarding number (i.e., the C-number), the ESIP SS module formulates the corresponding SIP request and transfers control to the pure SIP proxy server of the SIPext SSP node 204.

Figure 7:
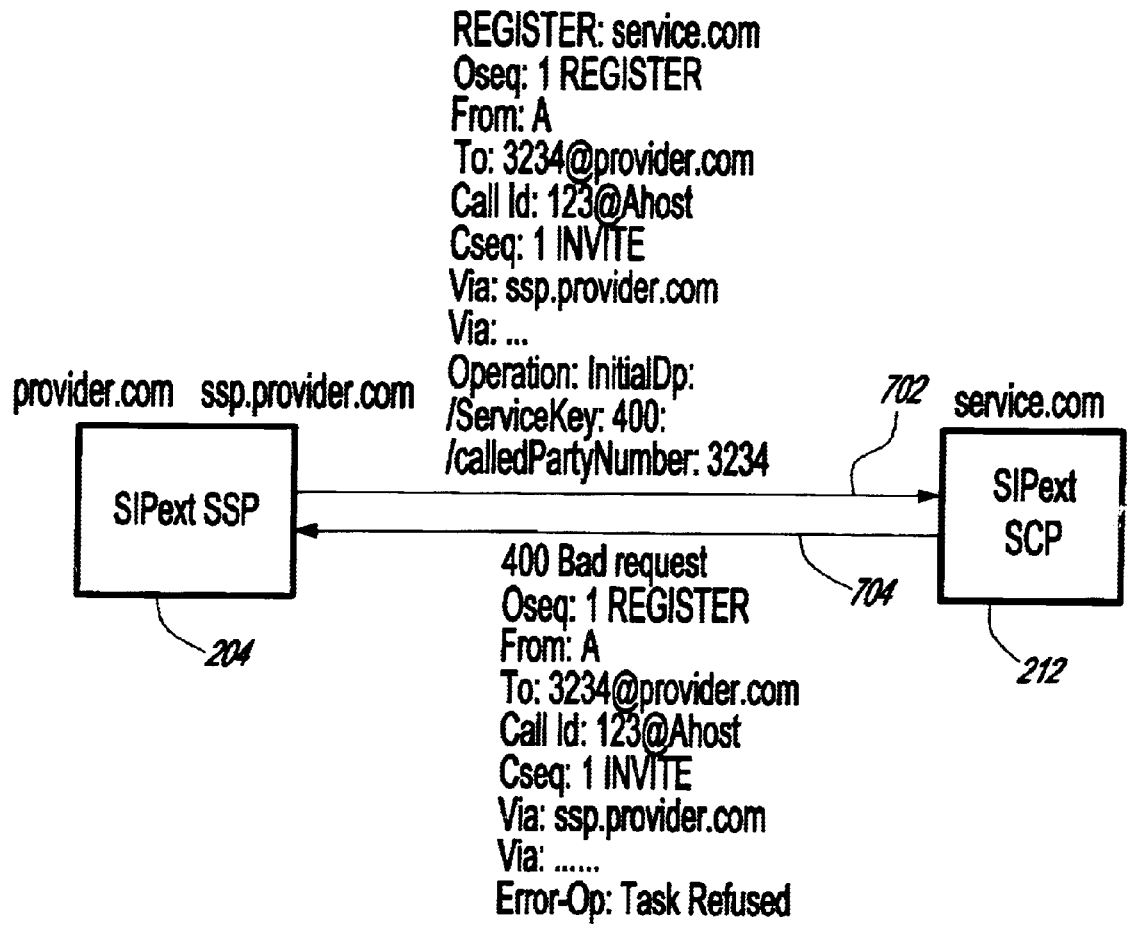
FIG. 7 depicts a functional message flow diagram illustrating the functionality of a SIPExt SSP component as a client, with its request to a SIPExt SCP node being unsuccessful.

FIG. 7 depicts a functional message flow diagram which illustrates the scenario wherein a SIPext REGISTER request (e.g., REGISTER request 702) is not successfully processed by the SIPext SCP node 212. A Bad Request message 704 is generated as a response, which preferably contains an Error-op: SIPext header for specifying the error type and parameters (if any).

Depending on the contents of the Error-op: header and related parametric information, the ESIP SS module of the SIPext SSP node 204 may take different actions. For example, it may retransmit the REGISTER request 602 immediately or after a predetermined time set forth in the Error-op: header field. Or, it may formulate a SIP message and transfer it to the SIP proxy server so that the caller is notified of a suitable response.

Referring now to FIGS. 8A–8D, depicted therein are several functional message flow diagrams which illustrate an exemplary VAS implementation using the SIPext protocol of the present invention. More specifically, the provisioning of a freephone/call forwarding service in accordance with the teachings of the present invention is illustrated. First, an exemplary service implementation using INAP is set forth in order to provide a framework for service provisioning with SIPext protocol. Thereafter, service-specific messages using the protocol are illustrated by way of the functional message flow diagrams.

Those skilled in the art should appreciate that depending on network-specific mechanisms for charging, there are several possible implementations of the call forwarding service in an IN-compliant environment. In the example provided herein, service charges are computed by the SCP. The exemplary INAP service implementation is described by the following sequence (where "→" denotes an operation sent from SSP to SCP; "←" denotes an operation sent from SCP to SSP):

1. →InitialDp(ServiceKey=0800, calledPartyNumber= 3456789)
2. ←Connect(destinationRoutingAddress=6543210, correlationId=1111) RequestReportBCSMEvent (eventTypeBCSM=o__Answer, monitorMode= notifyAndContinue, eventTypeBCSM=o__Disconnect, monitorMode=notifyAndContinue, bcsmEventCorrelationId=1111)
3. →EventReportBCSM(eventTypeBCSM=o__Answer, bcsmEventCorrelationId=1111)
4. →EventReportBCSM(eventTypeBCSM=o__ Disconnect, bcsmEventCorrelationId=1111)

Referring now to FIG. 8A, User A 202A at a host (denoted as Ahost) places a call to User B with address 8003234@provider.com by way of an INVITE message 802. Upon receiving the INVITE message, the SIPext SSP node 204 consults a trigger server (not shown) and determines that User B has a subscription with respect to the freephone/call forwarding service. Thereafter, a SIPext REGISTER message 804 containing two SIPext headers is formulated by the SIPext SSP node 204. The Operation: header specifies the SLP associated with the subscribed service that needs to be launched, and carries the call context data required for its execution. In the present example, this data is carried in the Called Party Number (B-number) parameter. Further, the Oseq: header is provided in accordance with the teachings of the present invention for specifying the operation sequence number.

Upon receiving the SIPext REGISTER message 804, the SIPext SCP node 212 analyzes the SIPext headers and launches the freephone SLP. After successfully executing the program, it generates an OK response 806 by copying all headers from the REGISTER message 804 except the Operation: headers. Two new Operation: headers are formulated by the SIPext SCP node instead, based on the results obtained from the SLP execution. The first one (Connect operation) specifies the destination number to which the call is to be routed or forwarded. The second operation header, Operation: RequestEventReport, instructs the SIPext SSP node to notify the SCP node for a Call Accepted (o__Answer) event or a Call Disconnected (o__Disconnected) event.

After receiving the OK response 806, the SIPext SSP node 204 executes the operations specified therein. The Connect operation results in generating a pure SIP INVITE request 808 and transmitting it over the SIP network to the forward address 4456@provider.com. Responsive to the Request-EventReport operation, the SIPext SSP node 204 monitors the messages with the specific Call-Id number and in order to notify the SCP node 212 if an ACK or BYE message is generated for that Call-Id. Those skilled in the art should readily appreciate that the ACK message corresponds to the IN o__Answer (i.e., Call Accepted) event, and BYE corresponds to the o__Disconnect (i.e., Call Disconnected) event.

FIG. 8B depicts the flow of SIP messages exchanged when a user 202C (i.e., User C) at the host 4456 accepts the forwarded call. An OK message is transmitted back from User C to the pure SIP proxy server part of the SIPext SSP node 204 which then forwards it to the caller, i.e., User A 202A as an OK response 812.

FIG. 8C depicts the flow of messages when the SIPext SSP node 204 receives an ACK message 813 from the caller's user agent in response to the OK response 812. The ACK message 813 is proxied by the SSP node 204 to User C 202C as the ACK response 814. Thereafter, a SIPext REGISTER request 815 is generated, including the BCS-MEventReport operation for notifying the SIPextSCP node 212 the occurrence of the o__Answer event. In response, the SIPext SCP node 212 transmits an OK conformation 816 to the SSP node 204 and launches an SLP that bills the call on the 4456 account.

The SIPext SSP node 204 continues to monitor the signaling messages for the Call-Id associated with the caller (User A's Call-Id, e.g., 123@Ahost). When one of the parties decides to terminate the connection, its user agent issues a BYE request, which corresponds to an o__Disconnect event. FIG. 8D depicts the scenario where User A 202A issues the BYE request 818 to the SIPext SSP node 204. In response, a proxy BYE 824 is provided to the callee, i.e., User C 202C. Thereafter, a SIPext REGISTER request 820 containing the EventReportBCSM operation header is generated towards the SCP node 212. In response to the o__Disconnect event reported from the SIPext SSP node 204, the billing SLP in the SCP node completes the call billing process. An OK response 822 is transmitted back to the SSP node 204, preferably without any Operation: headers, as there is no need for additional actions from the SCP or SSP nodes.

FIGS. 9A–9E depict functional message flow diagrams for a call distribution service provided in accordance with the teachings of the present invention. The following conditions are adopted in the exemplary scenario provided herein:

1. User B has a subscription for the call distribution Service.
2. The maximum number of calls that User B is allowed to answer is 50 calls per day.
3. If the number of calls received is greater than 50, the calls are forwarded to the C-number 6543210.

It should be readily apparent to those skilled in the art that the SIPext messages depicted in the FIGs. use the now-familiar header fields to instruct the SCP to launch appropriate SLPs associated with the service, depending on whether the call number threshold is reached or not. For the sake of brevity, accordingly, only the salient features of this example are set forth hereinbelow.

Figure 9B:
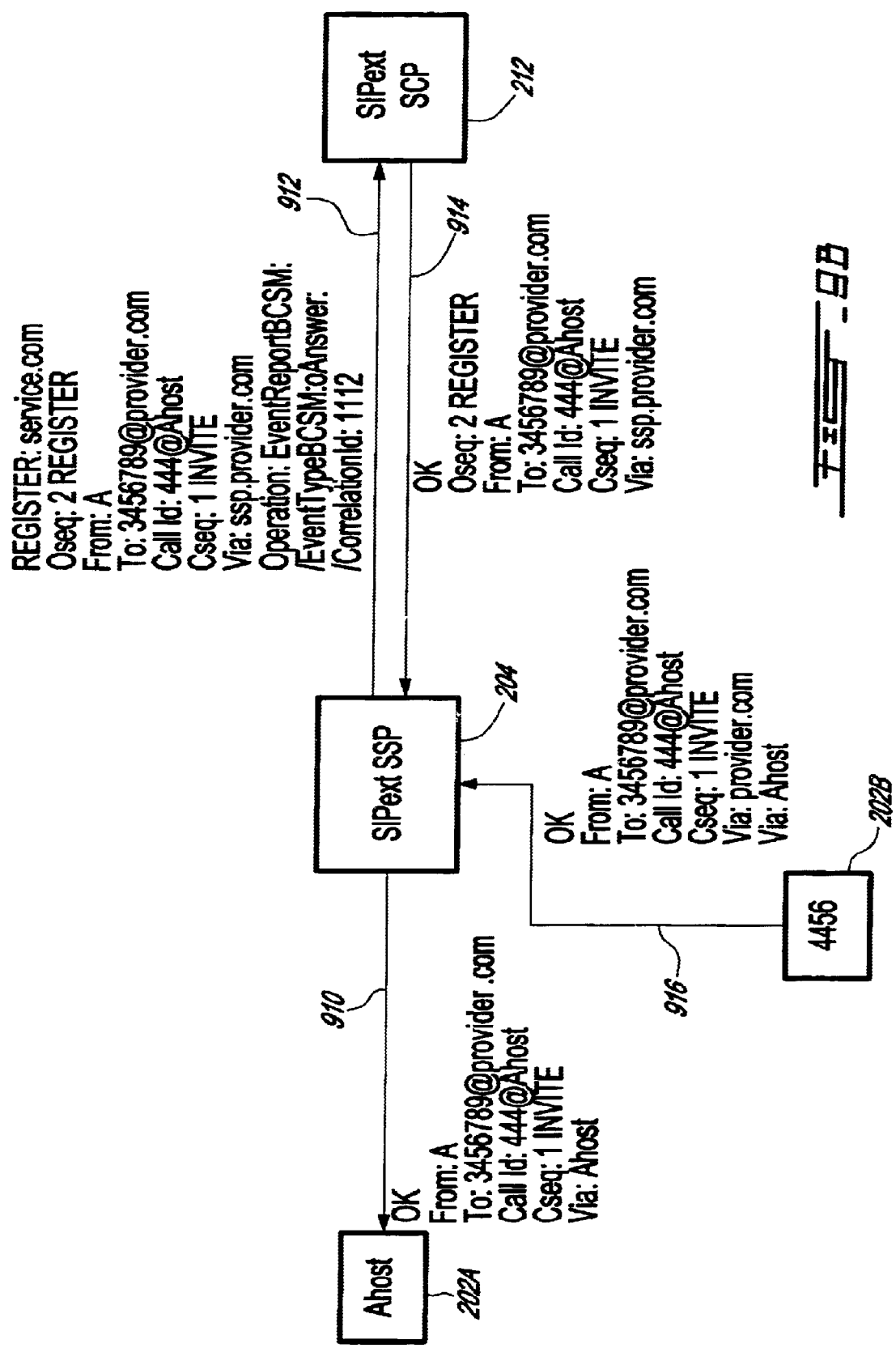

FIGS. 9A–9D illustrate the condition where the subscriber/user encounters fewer than 50 calls. Calls are passed to User B after appropriate SIPext REGISTER and OK messages between the SIPext SSP node 204 and SIPext SCP node 212 which executes the call distribution SLP. Where there is a busy signal 924 from User B 202B, as shown in FIG. 9C, the SIPext SSP node 204 proxies the same to the caller at Ahost (User A 202A) and notifies the SCP node 212 via a REGISTER request 920. A Temporarily Unavailable response 926 (illustrated in FIG. 9D) is provided to User A 202A when User B's agent sends repeated Ringing messages 932 back to the SIPext SSP node 204 and a timer associated with the user response expires. Furthermore, the SSP node 204 notifies the occurrence of o_NoAnswer event to the SCP node 212 via a REGISTER request 928.

Figure 9E:
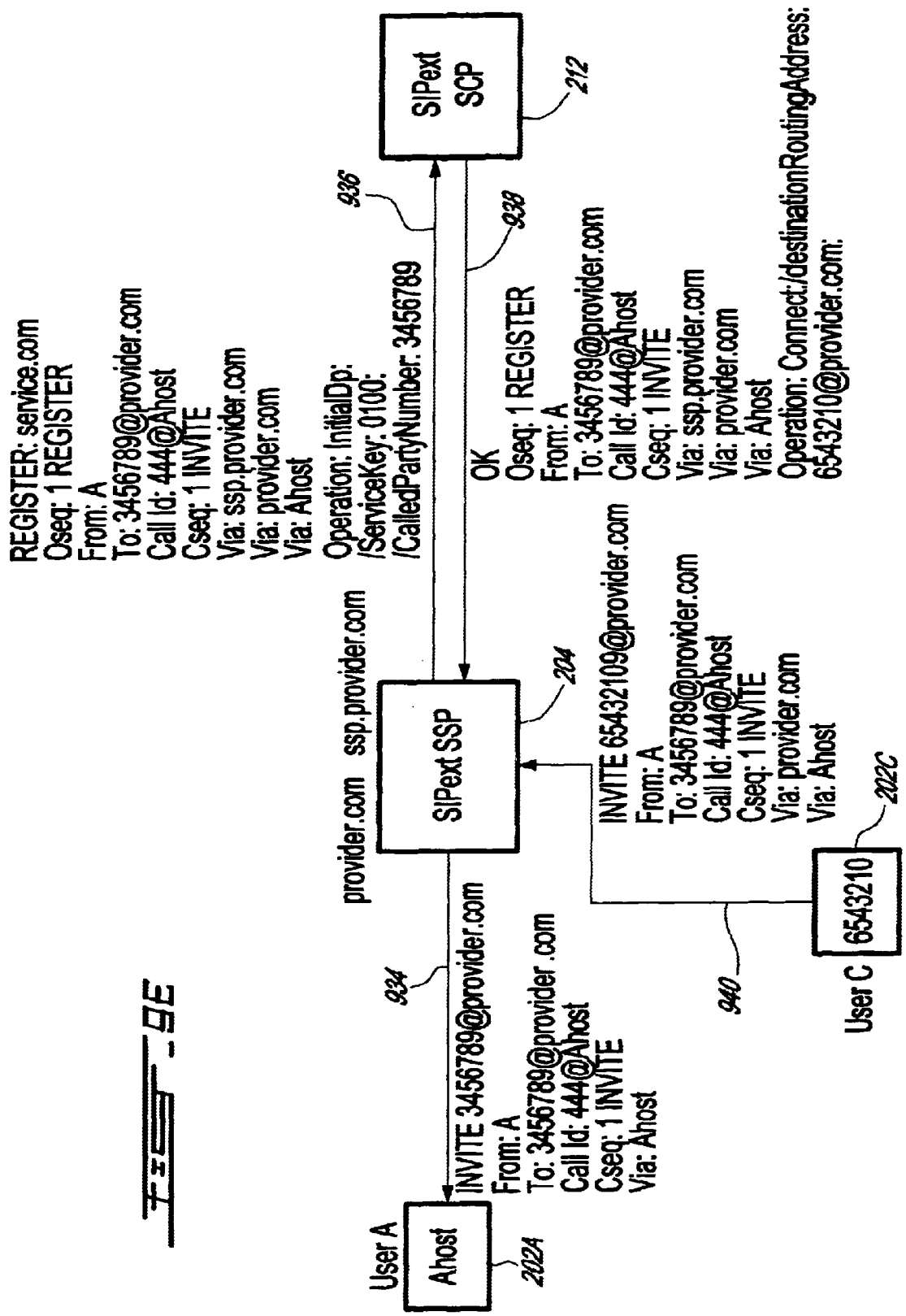

FIG. 9E depicts the situation where more than 50 calls are encountered by the user. The call distribution SLP in the SIPext SCP node 212 provides a routing number using the Operation: Connect header in the OK response 938, which is subsequently used by the SIP proxy portion of the SIPext SSP node 204 to forward the calls to User C 202C at 6543210.

Based on the foregoing, it should be appreciated that the present invention advantageously extends the capabilities of the existing SIP implementations to include access to the WIN/IN service logic base that is already installed and market-tested. Accordingly, the installed service base may continue to be re-used even as SIP-based VoIP network architectures evolve in the future. Those of ordinary skill in the art should realize that there exist tremendous incentives, economic as well as infrastructure-based, for network operators to re-use the expensive legacy SCP nodes as they migrate towards integrating the cellular infrastructures with IP-based PSNs. In addition, by appropriately linearizing the INAP parametric information in the header fields of SIPext messages, the present invention solves the problem of having to support multiple protocols in a network in order to provide the capability to access remote service logic nodes.

Further, it is believed that the operation and construction of the present invention will be apparent from the foregoing Detailed Description. While the method and system shown and described have been characterized as being preferred, it should be readily understood that various changes and modifications could be made therein without departing from the scope of the present invention as set forth in the following claims. For example, although the teachings of the present invention have been exemplified with two particular services, it should be understood that other VAS may also be provisioned in accordance with the teachings of the present invention. That is, in addition to the call forwarding and call distribution services exemplified herein, the teachings hereof may be also applied in the context of the following services: toll free and credit card calling, cellular hunt, selective call restriction, click to fax, double phone/ freephone, split charging, and multimedia applications such as tele-medicine, tele-education, video-on-demand, et cetera.

Furthermore, while generic SIP user agents have been described in the exemplary embodiments of the present invention, any combination of SIP-compliant entities such as intelligent mobile stations operable with a variety of air interface standards, taken in conjunction with VAS-enabled Personal Digital Assistants, "smart" phones, personal computers, laptop computers, palmtop computers, Information Appliances, wireless transceiver wrist watches, pagers, et cetera, may be provided for the purposes of the present invention. In addition, the innovative teachings contained herein may also be practiced in a VoIP network coupled to a PSTN, wherein the SIPext SSP node can trigger ESIP service requests to a service node having an appropriate SIPext server interface. Moreover, although the teachings of the present invention are exemplified by employing a SIPext SSP node having two different IP addresses, it should be appreciated that the present invention is not limited thereto and the innovative teachings contained herein may be advantageously practiced in networks having a SIPext SSP node with a single IP address also, wherein a suitable mechanism for differentiating between pure SIP and SIPext messages is provided. Accordingly, it should be realized that these and other numerous variations, substitutions, additions, re-arrangements and modifications are contemplated to be within the ambit of the present invention whose scope is solely limited by the claims set forth below.

What is claimed is:

1. A method of providing a Value-Added Service (VAS) in a telecommunications network operable with Session Initiation Protocol (SIP), the telecommunications network including a SIPext SSP server, a trigger server, and a service node having at least one Service Logic Program (SLP) associated with the VAS, wherein the SLP is operable with Intelligent Network Application Protocol (INAP), the method comprising the steps of:

receiving a request message in the SIPext SSP server from a first user, the request message for initiating a call to a second user;

upon receiving the request message, consulting the trigger server by the SIPext SSP server to obtain a user profile associated with at least one of the first and second users;

formulating a SIP register request by the SIPext SSP server based on the user profile obtained from the trigger server, upon encountering an armed detection point during call processing, the register request including at least one header field, wherein the header field contains information specifying an operation that the service node is to perform, the header field further including call context data associated with the call initiated by the first user;

transmitting the register request by the SIPext SSP server to the service node;

upon receiving the register request, executing at least one SLP by the service node based on the operation specified in the header field and the call context data associated therewith;

sending a SIP response message from the service node to the SIPext SSP server, the response message including a header field and a return result obtained in response to the execution of at least one SLP by the service node; and executing at least one action by the SIPext SSP server responsive to the header field and the return result in the response message received from the service node, the action being associated with the VAS.

2. The method of providing a VAS in a telecommunications network as set forth in claim 1, wherein the SIPext SSP server is addressable by two separate Internet Protocol (IP) addresses, a first IP address and a second IP address, and further wherein the request message is received in the SIPext SSP server from the first user using the first IP address.

3. The method of providing a VAS in a telecommunications network as set forth in claim 2, wherein the register request is sent from the SIPext SSP server to the service node using the second IP address.

4. The method of providing a VAS in a telecommunications network as set forth in claim 1, wherein the step of formulating the register request comprises the step of transforming INAP-compliant data structures associated with the VAS into linearly sequenced parametric data forming a portion of the header field of the register request.

5. The method of providing a VAS in a telecommunications network as set forth in claim 4, wherein the SIP-compliant response message from the service node comprises linearized INAP-compliant parametric information.

6. The method of providing a VAS in a telecommunications network as set forth in claim 4, wherein the header field in the SIP response message from the service node is organized in a Backus-Naur format.

7. The method of providing a VAS in a telecommunications network as set forth in claim 4, wherein the header field in the SIP register request from the SIPext SSP server is organized in a Backus-Naur form.

8. The method of providing a VAS in a telecommunications network as set forth in claim 1, wherein the return result comprises a destination routing number and the header field in the SIP response message from the service node includes a connect operation, responsive to which the SIPext SSP server forwards the call initiated by the first user to the destination routing number.

9. The method of providing a VAS in a telecommunications network as set forth in claim 1, wherein the return result comprises an error code, responsive to which the SIPext SSP server generates a SIP error message and forwards it to the first user.

10. An integrated telecommunications network for providing a Value-Added Service (VAS), comprising:

a SIPext SSP server including a proxy server and a service switching part, the proxy server for receiving a call initiation message from a first user with respect to a second user and the service switching part for determining if the second user has a subscription for the VAS;

a trigger server containing user profiles associated with the VAS, the trigger server being activatable in response to a determination by the service switching part that the second user has a subscription to the VAS;

means associated with the service switching part for formulating a register request based on user profile information for the second user, wherein the register request includes a header field containing an operation associated with the VAS; and a service node including an Intelligent Network Application Protocol (INAP)-compliant Service Logic Program (SLP) associated with the VAS and a SIPext SSP interface server for receiving and interpreting the register request from the service switching part, wherein the service node executes the SLP based on the contents of the header field in the register request received from the service switching part.

11. The integrated telecommunications network for providing a VAS as set forth in claim 10, wherein the proxy server has a first Internet Protocol (IP) address and the service switching part has a second IP address.

12. The integrated telecommunications network for providing a VAS as set forth in claim 10, wherein the register request contains linearized INAP-compliant parametric data associated with the operation.

13. A system for providing a Value-Added Service (VAS) to a user in a telecommunications network operable with Session Initiation Protocol (SIP), the telecommunications network including a SIPext SSP server, a trigger server, and a service node having at least one Service Logic Program (SLP) associated with the VAS, wherein the SLP is operable with Intelligent Network Application Protocol (INAP), the system comprising:

means for receiving a call initiation request with respect to the user;

means for querying the trigger server, responsive to the determination that the user has a subscription for the VAS, to obtain a user profile associated with the user;

means for formulating a SIP register request based on the user profile obtained from the trigger server, responsive to encountering an armed detection point in call processing, the register request including at least one header field, wherein the header field contains information specifying an operation that the service node is to perform with respect to the VAS, the header field further including call context data associated with the call initiation request with respect to the user;

means for transmitting the register request to the service node;

means for launching the SLP in the service node based on the operation specified in the header field and the call context data associated therewith;

means for sending a SIP response message from the service node to the SIPext SSP server, the response message including a header field and a return result obtained in response to the launching of the SLP in the service node; and means for executing an action by the SIPext SSP server responsive to the header field and the return result in the response message received from the service node, the action being associated with the VAS.

14. The system for providing a VAS to a user in a telecommunications network as set forth in claim 13, further comprising means for transforming INAP-compliant data structures associated with the VAS into linearly sequenced parametric data forming a portion of the header field of the register request.

15. The system for providing a VAS to a user in a telecommunications network as set forth in claim 14, wherein the return result comprises a destination routing number to which the call is to be forwarded.

* * * * *

UNITED STATES PATENT AND TRADEMARK OFFICE
CERTIFICATE OF CORRECTION

PATENT NO.         : 6,625,141 B1
APPLICATION NO. : 09/537592
DATED                  : September 23, 2003
INVENTOR(S)       : Glitho et al.

It is certified that error appears in the above-identified patent and that said Letters Patent is hereby corrected as shown below:

In Column 1, Line 40, delete "(VOIP)" and insert -- (VoIP) --, therefor.

In Column 3, Line 50, delete "SIPExt)" and insert -- SIPext) --, therefor.

In Column 3, Line 63, delete "SIPExt" and insert -- SIPext --, therefor.

In Column 3, Line 65, delete "SIPExt" and insert -- SIPext --, therefor.

In Column 3, Line 67, delete "SIPExt" and insert -- SIPext --, therefor.

In Column 4, Line 2, delete "SIPExt" and insert -- SIPext --, therefor.

In Column 4, Line 3, delete "SIPExt" and insert -- SIPext --, therefor.

In Column 5, Line 56, below "CRLF" insert -- [message-body] --.

In Column 6, Line 54, delete "user2@(location-A," and insert -- user2@location-A, --, therefor.

In Column 6, Line 61, delete "User-102" and insert -- User-1 102 --, therefor.

In Column 7, Line 12, delete "<http.://www.-ietf" and insert -- <http://www.ietf --, therefor.

In Column 7, Line 28, delete "Require" and insert -- Require: --, therefor.

In Column 8, Line 38, delete "Require." and insert -- Require: --, therefor.

In Column 10, Line 19, delete "result-arguments *("argument" argument-value ";") and insert -- result-arguments= *("argument" ":" argument value ";") --, therefor.

In Column 10, Line 20, delete "*(/1*alpha))" and insert -- *(//(1*alpha)) --, therefor.

In Column 10, Line 37, after "parameter-value" insert -- = --.

In Column 11, Line 28, delete "requestedInformationvalue" and insert -- requestedInformationValue --, therefor.

UNITED STATES PATENT AND TRADEMARK OFFICE
CERTIFICATE OF CORRECTION

PATENT NO. : 6,625,141 B1
APPLICATION NO. : 09/537592
DATED : September 23, 2003
INVENTOR(S) : Glitho et al.

It is certified that error appears in the above-identified patent and that said Letters Patent is hereby corrected as shown below:

In Column 16, Line 18, delete "SIPextSCP" and insert -- SIPext SCP --, therefor.

In Column 19, Line 4, in Claim 6, delete "format." and insert -- form. --, therefor.

Signed and Sealed this

Thirtieth Day of December, 2008

JON W. DUDAS
*Director of the United States Patent and Trademark Office*